(12) United States Patent
Hurley et al.

(10) Patent No.: US 9,581,723 B2
(45) Date of Patent: Feb. 28, 2017

(54) METHOD FOR CHARACTERIZING A GEOLOGICAL FORMATION TRAVERSED BY A BOREHOLE

(75) Inventors: Neil Francis Hurley, Boston, MA (US); Tuanfeng Zhang, Lexington, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 978 days.

(21) Appl. No.: 12/384,945

(22) Filed: Apr. 10, 2009

(65) Prior Publication Data

US 2009/0262603 A1    Oct. 22, 2009

Related U.S. Application Data

(60) Provisional application No. 61/044,018, filed on Apr. 10, 2008.

(51) Int. Cl.
*G01V 1/00*     (2006.01)
*G01V 11/00*    (2006.01)

(52) U.S. Cl.
CPC ........ *G01V 11/00* (2013.01); *G01V 2210/665* (2013.01)

(58) Field of Classification Search
CPC .......................... G01V 11/00; G01V 2210/665
(Continued)

(56) References Cited

U.S. PATENT DOCUMENTS 3,013,467 A    12/1951   Minsky
3,406,776 A    10/1968   Henry
(Continued)

FOREIGN PATENT DOCUMENTS

CN         101802649 A    8/2010
DE    102004043992 A1    3/2006
(Continued)

OTHER PUBLICATIONS

Zhang, "3D Porosity Medeling of Carbonate Reservoir using Continuous Multiple-point Statistics Simulation", SPE Annual Technical Conference and Exhibition, Oct. 9-12, 2005.*
(Continued)

*Primary Examiner* — Krystine Breier
(74) *Attorney, Agent, or Firm* — Alec J. McGinn

(57) ABSTRACT

Methods for characterizing a geological formation, the methods include retrieving measured data provided by a measuring tool along one or more logged borehole length for a borehole, another borehole or both in order to produce a borehole imaging log. Selecting depth-defined intervals of the borehole imaging log as training images for inputting in a multi-point geostatistical model. Determining pattern based simulations for each training image using a pixel-based template of the multi-point geostatistical model so as to obtain training image patterns. Using the pattern based simulation of each training image to assign to each of the training image a corresponding training image pattern. Constructing from the training image patterns one or more fullbore image log of a borehole wall of the borehole. Repeat the second to fourth steps through the one or more logged borehole length in order to construct fullbore images from successive, adjacent training images.

23 Claims, 13 Drawing Sheets
(9 of 13 Drawing Sheet(s) Filed in Color)

(58) Field of Classification Search
USPC .................. 367/35, 86; 345/419; 702/11, 16
See application file for complete search history.

(56) References Cited

U.S. PATENT DOCUMENTS

| | | | |
|---|---|---|---|
| 3,469,311 A | 9/1969 | Van Benthuysen et al. |
| 4,079,421 A | 3/1978 | Kermisch |
| 4,124,302 A | 11/1978 | Kuzmin |
| 4,480,921 A | 11/1984 | Leveque et al. |
| 4,483,619 A | 11/1984 | Leveque et al. |
| 4,555,181 A | 11/1985 | Klumper et al. |
| 4,567,759 A | 2/1986 | Ekstrom et al. |
| 4,702,607 A | 10/1987 | Kinameri |
| 4,734,578 A | 3/1988 | Horikawa |
| 4,750,888 A | 6/1988 | Allard et al. |
| 4,758,088 A | 7/1988 | Doyle |
| 4,783,751 A | 11/1988 | Ehrlich et al. |
| 4,821,164 A | 4/1989 | Swanson |
| 4,863,252 A | 9/1989 | McCarthy et al. |
| 4,868,883 A | 9/1989 | Chen |
| 4,877,960 A | 10/1989 | Messerschmidt et al. |
| 4,912,683 A * | 3/1990 | Katahara ............ E21B 47/082 |
| | | | 181/105 |
| 4,927,254 A | 5/1990 | Kino et al. |
| 4,972,258 A | 11/1990 | Wolf et al. |
| 4,997,242 A | 3/1991 | Amos |
| 5,022,743 A | 6/1991 | Kino et al. |
| 5,032,720 A | 7/1991 | White |
| 5,144,477 A | 9/1992 | White |
| 5,162,941 A | 11/1992 | Favro et al. |
| RE34,214 E | 4/1993 | Carlsson et al. |
| 5,200,705 A | 4/1993 | Clark et al. |
| 5,220,403 A | 6/1993 | Batchelder et al. |
| 5,233,568 A | 8/1993 | Kan et al. |
| 5,239,178 A | 8/1993 | Derndinger et al. |
| 5,283,684 A | 2/1994 | Thomas et al. |
| 5,289,407 A | 2/1994 | Strickler et al. |
| 5,334,830 A | 8/1994 | Fukuyama et al. |
| 5,356,110 A | 10/1994 | Eddy |
| 5,384,806 A | 1/1995 | Agazzi |
| 5,463,897 A | 11/1995 | Prater et al. |
| 5,479,252 A | 12/1995 | Worster et al. |
| 5,537,247 A | 7/1996 | Xiao |
| 5,557,452 A | 9/1996 | Harris |
| 5,560,244 A | 10/1996 | Prater et al. |
| 5,587,832 A | 12/1996 | Krause |
| 5,659,420 A | 8/1997 | Wakai et al. |
| 5,675,443 A | 10/1997 | Dorsel |
| 5,713,364 A | 2/1998 | DeBaryshe et al. |
| 5,714,682 A | 2/1998 | Prater et al. |
| 5,777,342 A | 7/1998 | Baer |
| 5,809,163 A | 9/1998 | Delhomme et al. |
| 5,813,987 A | 9/1998 | Modell et al. |
| 5,814,820 A | 9/1998 | Dong et al. |
| 5,835,883 A | 11/1998 | Neff et al. |
| 5,838,634 A | 11/1998 | Jones et al. |
| 5,866,911 A | 2/1999 | Baer |
| 5,887,009 A | 3/1999 | Mandella et al. |
| 5,923,465 A | 7/1999 | Byrd |
| 5,923,466 A | 7/1999 | Krause et al. |
| 5,939,709 A | 8/1999 | Ghislain et al. |
| 5,952,668 A | 9/1999 | Baer |
| 6,009,065 A | 12/1999 | Glushko et al. |
| 6,011,557 A | 1/2000 | Keskes et al. |
| 6,025,985 A | 2/2000 | Leytes et al. |
| 6,033,100 A | 3/2000 | Marquiss et al. |
| 6,071,748 A | 6/2000 | Modlin et al. |
| 6,088,656 A | 7/2000 | Ramakrishnan et al. |
| 6,097,025 A | 8/2000 | Modlin et al. |
| 6,098,031 A | 8/2000 | Svetkoff et al. |
| 6,104,945 A | 8/2000 | Modell et al. |
| 6,125,079 A * | 9/2000 | Birchak ............... G01V 1/44 |
| | | | 181/104 |
| 6,133,986 A | 10/2000 | Johnson |
| 6,148,114 A | 11/2000 | Han |
| 6,159,425 A | 12/2000 | Edwards et al. |
| 6,177,998 B1 | 1/2001 | Svetkoff et al. |
| 6,181,425 B1 | 1/2001 | Svetkoff et al. |
| 6,185,030 B1 | 2/2001 | Overbeck |
| 6,187,267 B1 | 2/2001 | Taylor et al. |
| 6,201,639 B1 | 3/2001 | Overbeck |
| 6,248,988 B1 | 6/2001 | Krantz |
| 6,249,347 B1 | 6/2001 | Svetkoff et al. |
| 6,259,104 B1 | 7/2001 | Baer |
| 6,287,595 B1 | 9/2001 | Loewy et al. |
| 6,288,782 B1 | 9/2001 | Worster et al. |
| 6,297,018 B1 | 10/2001 | French et al. |
| 6,309,948 B1 | 10/2001 | Lin et al. |
| 6,313,960 B2 | 11/2001 | Marquiss et al. |
| 6,316,153 B1 | 11/2001 | Goodman et al. |
| 6,317,207 B2 | 11/2001 | French et al. |
| 6,326,605 B1 | 12/2001 | Modlin et al. |
| 6,335,824 B1 | 1/2002 | Overbeck |
| 6,366,357 B1 | 4/2002 | Svetkoff et al. |
| 6,385,484 B2 | 5/2002 | Nordstrom et al. |
| 6,411,838 B1 | 6/2002 | Nordstrom et al. |
| 6,452,686 B1 | 9/2002 | Svetkoff et al. |
| 6,466,316 B2 | 10/2002 | Modlin et al. |
| 6,469,311 B1 | 10/2002 | Modlin et al. |
| 6,483,582 B2 | 11/2002 | Modlin et al. |
| 6,488,892 B1 | 12/2002 | Burton et al. |
| 6,498,335 B2 | 12/2002 | Modlin et al. |
| 6,499,366 B1 | 12/2002 | Meadows et al. |
| 6,516,080 B1 | 2/2003 | Nur |
| 6,545,264 B1 | 4/2003 | Stern |
| 6,548,796 B1 | 4/2003 | Silvermintz et al. |
| 6,548,810 B2 | 4/2003 | Zaluzec |
| 6,576,476 B1 | 6/2003 | Taylor et al. |
| 6,657,216 B1 | 12/2003 | Poris |
| 6,661,515 B2 | 12/2003 | Worster et al. |
| 6,710,316 B2 | 3/2004 | Mandella et al. |
| 6,713,742 B2 | 3/2004 | Mandella et al. |
| 6,713,772 B2 | 3/2004 | Goodman et al. |
| 6,714,682 B2 | 3/2004 | Kaneda |
| 6,750,974 B2 | 6/2004 | Svetkoff et al. |
| 6,756,202 B2 | 6/2004 | Dorsel et al. |
| 6,760,613 B2 | 7/2004 | Nordstrom et al. |
| 6,768,918 B2 | 7/2004 | Zelenchuk |
| 6,791,690 B2 | 9/2004 | Corson et al. |
| 6,816,787 B2 | 11/2004 | Ramamoorthy et al. |
| 6,818,903 B2 | 11/2004 | Schomacker et al. |
| 6,821,787 B2 | 11/2004 | Neilson et al. |
| 6,825,921 B1 | 11/2004 | Modlin et al. |
| 6,826,422 B1 | 11/2004 | Modell et al. |
| 6,826,520 B1 | 11/2004 | Khan et al. |
| 6,835,574 B2 | 12/2004 | Neilson et al. |
| 6,839,661 B2 | 1/2005 | Costa et al. |
| 6,844,123 B1 | 1/2005 | Ekberg et al. |
| 6,845,325 B2 * | 1/2005 | Valero et al. ................ 702/14 |
| 6,847,460 B2 | 1/2005 | Farrell et al. |
| 6,847,490 B1 | 1/2005 | Modell et al. |
| 6,864,097 B1 | 3/2005 | Schembri et al. |
| 6,876,781 B2 | 4/2005 | Khoury |
| 6,883,158 B1 | 4/2005 | Sandstrom et al. |
| 6,886,632 B2 | 5/2005 | Raghuraman et al. |
| 6,897,405 B2 | 5/2005 | Cheng et al. |
| 6,902,935 B2 | 6/2005 | Kaufman et al. |
| 6,903,347 B2 | 6/2005 | Baer |
| 6,913,603 B2 | 7/2005 | Knopp et al. |
| 6,917,468 B2 | 7/2005 | Thomas |
| 6,933,154 B2 | 8/2005 | Schomacker et al. |
| 6,937,023 B2 | 8/2005 | McElhinney |
| 6,942,873 B2 | 9/2005 | Russell et al. |
| 6,943,968 B2 | 9/2005 | Nielson et al. |
| 6,952,668 B1 | 10/2005 | Kapilow |
| 6,982,431 B2 | 1/2006 | Modlin et al. |
| 6,987,570 B1 | 1/2006 | Schmit et al. |
| 6,991,765 B2 | 1/2006 | Neilson et al. |
| 6,992,761 B2 | 1/2006 | Modlin et al. |
| 7,005,306 B1 | 2/2006 | Poris |
| 7,018,842 B2 | 3/2006 | Dorsel et al. |
| 7,042,647 B2 | 5/2006 | Lo |
| 7,045,362 B2 | 5/2006 | Hartwich et al. |
| 7,068,583 B2 | 6/2006 | Khoury |

(56) References Cited

U.S. PATENT DOCUMENTS

| | | |
|---|---|---|
| 7,071,477 B2 | 7/2006 | Baer |
| 7,075,100 B2 | 7/2006 | Saccomanno et al. |
| 7,092,107 B2 | 8/2006 | Babayoff et al. |
| 7,103,401 B2 | 9/2006 | Schomacker et al. |
| 7,127,282 B2 | 10/2006 | Nordstrom et al. |
| 7,133,779 B2 | 11/2006 | Tilke et al. |
| 7,136,518 B2 | 11/2006 | Griffin et al. |
| 7,140,119 B2 | 11/2006 | Badami et al. |
| 7,154,605 B2 | 12/2006 | Worster et al. |
| 7,158,228 B2 | 1/2007 | Psaltis et al. |
| 7,187,810 B2 | 3/2007 | Clune et al. |
| 7,187,816 B2 | 3/2007 | Huang |
| 7,199,882 B2 | 4/2007 | Svetkoff et al. |
| 7,205,553 B2 | 4/2007 | Dorsel et al. |
| 7,224,162 B2 | 5/2007 | Proett et al. |
| 7,230,725 B2 | 6/2007 | Babayoff et al. |
| 7,251,398 B2 | 7/2007 | Baets et al. |
| 7,260,248 B2 | 8/2007 | Kaufman et al. |
| 7,262,889 B2 | 8/2007 | Sun et al. |
| 7,280,203 B2 | 10/2007 | Olschewski |
| 7,309,867 B2 | 12/2007 | Costa et al. |
| 7,310,547 B2 | 12/2007 | Zelenchuk |
| 7,312,919 B2 | 12/2007 | Overbeck |
| 7,324,710 B2 | 1/2008 | Andersson et al. |
| 7,330,273 B2 | 2/2008 | Podoleanu et al. |
| 7,345,975 B2 | 3/2008 | Fadeyev et al. |
| 7,363,158 B2 | 4/2008 | Stelting et al. |
| 7,365,858 B2 | 4/2008 | Fang-Yen et al. |
| 7,376,068 B1 | 5/2008 | Khoury |
| 7,384,806 B2 | 6/2008 | Worster et al. |
| 7,444,616 B2 | 10/2008 | Sandstrom et al. |
| 7,474,407 B2 | 1/2009 | Gutin |
| 7,483,152 B2 | 1/2009 | Jovancicevic et al. |
| 7,516,055 B2 | 4/2009 | Strebelle |
| 7,538,879 B2 | 5/2009 | Power |
| 7,545,510 B2 | 6/2009 | Lee et al. |
| 7,557,581 B2 * | 7/2009 | Ostermeier .......... G01V 3/38 324/338 |
| 7,630,517 B2 | 12/2009 | Mirowski et al. |
| 7,718,351 B2 | 5/2010 | Ying et al. |
| 7,765,091 B2 | 7/2010 | Lee et al. |
| 7,783,462 B2 | 8/2010 | Landis, Jr. et al. |
| 7,933,757 B2 | 4/2011 | Awwiller |
| 8,045,153 B2 | 10/2011 | Mimura et al. |
| 8,095,349 B2 | 1/2012 | Kelkar et al. |
| 8,311,788 B2 | 11/2012 | Hurley et al. |
| 8,900,508 B2 | 12/2014 | Shin et al. |
| 8,908,925 B2 | 12/2014 | Hurley et al. |
| 2002/0031477 A1 | 3/2002 | Loewy et al. |
| 2005/0002319 A1 | 1/2005 | Fadeyev et al. |
| 2005/0010799 A1 | 1/2005 | Kelley et al. |
| 2005/0057756 A1 | 3/2005 | Fang-Yen et al. |
| 2005/0105097 A1 | 5/2005 | Fang-Yen et al. |
| 2005/0128488 A1 | 6/2005 | Yelin et al. |
| 2005/0192966 A1 | 9/2005 | Hilbert et al. |
| 2005/0202660 A1 | 9/2005 | Cohen et al. |
| 2005/0213430 A1 | 9/2005 | Jovancicevic et al. |
| 2005/0231727 A1 | 10/2005 | Podoleanu et al. |
| 2005/0235507 A1 | 10/2005 | Badami et al. |
| 2006/0038571 A1 | 2/2006 | Ostermeier et al. |
| 2006/0041410 A1 | 2/2006 | Strebelle |
| 2006/0045421 A1 | 3/2006 | Baets et al. |
| 2006/0102486 A1 | 5/2006 | Bentley et al. |
| 2006/0126991 A1 | 6/2006 | Huang |
| 2006/0132790 A1 | 6/2006 | Gutin |
| 2006/0136419 A1 | 6/2006 | Brydon et al. |
| 2006/0141617 A1 | 6/2006 | Desai et al. |
| 2006/0193777 A1 | 8/2006 | Southall et al. |
| 2006/0238842 A1 | 10/2006 | Sun et al. |
| 2006/0256343 A1 | 11/2006 | Choma et al. |
| 2007/0014435 A1 | 1/2007 | Mirowski et al. |
| 2007/0165241 A1 | 7/2007 | Laguart Bertran et al. |
| 2007/0203677 A1 | 8/2007 | Awwiller |
| 2007/0213942 A1 | 9/2007 | Ponson et al. |
| 2007/0216989 A1 | 9/2007 | Nerin et al. |
| 2007/0239359 A1 | 10/2007 | Stelting et al. |
| 2007/0265813 A1 | 11/2007 | Unal et al. |
| 2008/0057479 A1 | 3/2008 | Grenness |
| 2008/0123106 A1 | 5/2008 | Zeng et al. |
| 2008/0218850 A1 | 9/2008 | Power |
| 2008/0266548 A1 | 10/2008 | Lee et al. |
| 2009/0062496 A1 | 3/2009 | Shaffer et al. |
| 2009/0104549 A1 | 4/2009 | Sandstrom et al. |
| 2009/0114544 A1 | 5/2009 | Rousseau et al. |
| 2009/0164182 A1 | 6/2009 | Pedersen et al. |
| 2009/0259446 A1 | 10/2009 | Zhang et al. |
| 2009/0262603 A1 | 10/2009 | Hurley |
| 2009/0299714 A1 | 12/2009 | Kelkar et al. |
| 2010/0155142 A1 | 6/2010 | Thambynayagam et al. |
| 2010/0299125 A1 | 11/2010 | Ding et al. |
| 2010/0326669 A1 | 12/2010 | Zhu et al. |
| 2011/0004446 A1 | 1/2011 | Dorn et al. |
| 2011/0004447 A1 | 1/2011 | Hurley |
| 2011/0004448 A1 | 1/2011 | Hurley et al. |
| 2011/0015907 A1 | 1/2011 | Crawford et al. |
| 2011/0181701 A1 | 7/2011 | Varslot et al. |
| 2012/0275658 A1 | 11/2012 | Hurley et al. |
| 2012/0277996 A1 | 11/2012 | Hurley et al. |
| 2012/0281883 A1 | 11/2012 | Hurley et al. |

FOREIGN PATENT DOCUMENTS

| | | |
|---|---|---|
| EA | 200701136 | 8/2008 |
| EP | 0147316 | 12/1983 |
| EP | 0114726 | 8/1984 |
| EP | 1098166 B1 | 5/2001 |
| EP | 1630578 A2 | 3/2006 |
| EP | 1630578 A3 | 3/2006 |
| EP | 1739471 A1 | 1/2007 |
| EP | 1739471 B1 | 1/2007 |
| EP | 1805477 B1 | 7/2007 |
| EP | 2056381 B1 | 5/2009 |
| GB | 2439778 A | 1/2008 |
| RU | 2166630 | 5/2001 |
| RU | 2289829 | 12/2006 |
| WO | 0041006 | 7/2000 |
| WO | 0041006 A1 | 7/2000 |
| WO | 0107891 A2 | 2/2001 |
| WO | 0173431 A2 | 10/2001 |
| WO | 2004066337 A2 | 6/2004 |
| WO | 2005001445 A2 | 1/2005 |
| WO | 2005052220 A1 | 6/2005 |
| WO | 2005054780 A1 | 6/2005 |
| WO | 2005077255 A1 | 8/2005 |
| WO | 2005085804 A1 | 9/2005 |
| WO | 2005096061 A1 | 10/2005 |
| WO | 2005103827 A1 | 11/2005 |
| WO | 2005108911 A1 | 11/2005 |
| WO | 2005108965 | 11/2005 |
| WO | 2006021205 A1 | 3/2006 |
| WO | 2006042696 A1 | 4/2006 |
| WO | 2006065772 A2 | 6/2006 |
| WO | 2006069443 A1 | 7/2006 |
| WO | 2006078839 A2 | 7/2006 |
| WO | 2006105579 A1 | 10/2006 |
| WO | 2006116231 A1 | 11/2006 |
| WO | 2006120646 A1 | 11/2006 |
| WO | 2007007052 A2 | 1/2007 |
| WO | 2008000078 A1 | 1/2008 |
| WO | 2008078096 A2 | 7/2008 |
| WO | 2008078099 A1 | 7/2008 |
| WO | 2008099174 A1 | 8/2008 |
| WO | 2008125869 A1 | 10/2008 |
| WO | 2008129233 A1 | 10/2008 |
| WO | 2008147280 A1 | 12/2008 |
| WO | 2009046181 A1 | 4/2009 |
| WO | 2009155127 | 12/2009 |

OTHER PUBLICATIONS

Zhang, "3D Porosity Modeling of a Carbonate Reservoir using Continuous Multiple-Point Statistics Simulation", SPE Annual Technical Conference and Exhibition, Oct. 9-12, 2005.*

(56) References Cited

OTHER PUBLICATIONS

Zhang, "3D Porosity Modeling of a Carbonite Reservoir using continuous Multiple-point Statistics Simulation" SPE Annual Technical Conference and Exhibition, Oct. 9-12 2005.*
Zhang, "Filter based Classification of training image Patterns for Spatial Simulation", Mathematical Geology, vol. 38, No. 1, Jan. 2006.*
Zhang "3D Porosity Modeling of a Carbonate Reservoir using Continuous Multiple-Point Statistics Simulation", SPE Annual Technical Conference and Exhibition, Oct. 9-12 2005.*
Schlumberger, "Formation MicroScanner Image Interpretation", 1989.*
Zhang, et al, "Models and methods for determining transport properties of touching-vug carbonates" SPE 96027, presented at the SPE Annual Technical Conference and Exhibition, Dallas, TX, Oct. 9-12, 2005, 9 pages.
Zhang, et al, "3D porostly modeling of a carbonate reservoir using continuous multiple-point statistics simulation" SPE Journal vol. 11, Sep. 2006, pp. 375-379.
Zhang, T. 2006a, "Filter-based training image pattern classification for spatial pattern simulation" PhD dissertation, Stanford University, Palo Alto, CA, Mar. 2006, 153 pages.
Zhang, et al, 2006b, "Filter-based classification of training image patterns for spatial pattern simulation" Mathematical Geology, vol. 38, No. 1, pp. 63-80.
Zhang, T. "Incorporating geological conceptual models and interpretations into reservoir modeling using multi-point geostatistics" Earth Science Frontiers, vol. 15, No. 1, Jan. 2008, pp. 26-35.
Zhang, et al, "Numerical modeling of heterogeneous carbonated and multi-scale dynamics" Presented at the SPWLA 50th Annual Logging Symposium, The Woodlands, Texas, Jun. 21-24, 2009, 12 pages.
Zulderveld, K, "Contrast limited adaptive histograph equalization" in Heckbert, P. S., Graphic Gems IV, San Diego: Academic Press Professional, 1994, pp. 474-485.
Pizer, et al, "Adaptive histogram equalization and its variations" Computer Vision, Graphics and Image Processing, vol. 39, No. 3, 1987, pp. 355-368.
Prebisch, et al, "Globally optimal stitching of tiled 3D microscopic image acquisitions" Bioinformatics Advance Access, vol. 25, No. 11, Apr. 2009, 3 pages.
Prodanovic, et al, "Porous structure and fluid partioning in polyethylene cores from X-ray microtomographic imaging" Journal of Colloid and interface Science, vol. 298, 2005, pp. 282-297.
Pyrcz, et al, "The whole story on the hole effect", in Serston, S. (ed.) Geostatistical Association of Australasia, Newsletter 18, May 2003, 16 pages.
Qi, D., Upscaling theory and application techniques for reservoir simulation: Lambert Academic Publishing, Saarbrucken, Germany, 2009, 7 pages.
Ramakrishnan, et al., "A petrophysical and petrographic study of carbonate cores from the Thamama formation" SPE 49502, presented at the 8th Abu Dhabi International Petroleum Exhibition and Conference, Abu Dhabi, U.A.E., Oct. 11-14, 1998, 14 pages.
Ramamoorthy, et al, "A new workflow for petrophysical and textural evaluation of carbonated reservoirs" Paper B presented at the SPWLA 49th Annual Logging Symposium, Edinburgh, Scotland, May 25-26, 2008, 15 pages.
Reid, et al, "Monterey Formation porcelantle reservoirs of the Elk Hills field, Kern County, California" AAPG Bulletin, vol. 85, No. 1, Jan. 2001, pp. 169-189.
Ribes, et al, "Applications of confocal macroscope-microscope luminescence imaging to sediment cores" New Techniques in Sediment Core Analysis: Geological Society of London, Special Publication vol. 267, 2006, pp. 141-150.
Roerdink, et al, "The watershed transform: Definitions, algorithms and parallelization stratetegies" Fundamenta Informaticae, vol. 41, 2001, pp. 187-226.

Russell, et al, "Rock types and permeability prediction from dipmeter and image logs: Shualba reservoir (Aptian), Abu Dhabi" AAPG Bulletin, vol. 86, No. 10, Oct. 2002, pp. 1709-1732.
Sahoo, et al, "A survey of thresholding techniques" Computer Vision, Graphics, and Image Processing, vol. 41, No. 2, 1986, pp. 233-260.
Sattykov, "The determination of the size distribution of particles in a opaque material from a measurement of size distribution of their sections" In Ellas, H (ed) Stereology: Proc. Second Int. Cong. for Stereology, New York: Springer-Verlag, 1967, pp. 163-173.
Schlumberger, "Stratigraphic high resolution dipmeter tool" Schlumberger Ltd., Paris, Document No. M-08630, 1983, 26 pages.
Sedsim, 2010, https://wiki.csiro.au/confluence/display/seabedchange/Home, accessed Oct. 10, 2 pages.
Sezgin, et al, "Survey over image thresholding techniques and quantitative performance evaluation" Journal of Electronic Imaging, vol. 13, No. 1, Jan. 2004, pp. 146-165.
Siddiquil, et al, "Data visualization challenges for displaying laboratory core and flow data in three-dimensions" SPE 106334, presented at the SPE Technical Symposium of Saudi Arabia, May 14-16, 2005, 9 pages.
Siddiqull, et al, "Techniques for extracting reliable density and porosity data from cultings" SPE 96918, presented at the SPE Annual Technical Conference and Exhibition, Dallas, TX, Oct. 9-12, 2005, 13 pages.
Solymar, et al, "Image analysis and estimation of porosity and permeability of Amager Greensand, Upper Cretaceous, Denmark" Physics and Chemistry of the Earth, Part A: Solid Earth and Geodesy, vol. 24, No. 7, 1999, pp. 587-591.
Strebelle, "Conditional simulation of complex geological structures using multiple point statistics" Mathematical Geology, vol. 34, No. 1, Jan. 2002, pp. 1-21.
Strebelle, et al, "Modeling of a deepwater turbidlte reservoir conditional to seismic data using principle component analysis and multiple-point geostatistics" SPE Journal, Sep. 2003, pp. 227-235.
Strebelle, et al, "Non-stationary multiple-point geostatistical models", In Leuangthong, O. and Deutsch, C. V., eds.: Geostatistics, vol. 1, 2004, pp. 235-244.
Sulcmez, et al, "Pore network modeling: A new technology for SCAL predictions and interpretations" Saudi Arabia Oil and Gas, Issue 5, 2006 pp. 64-70.
Taud, et al, "Porosity estimation method by x-ray computed tomography" Journal of Petroleum Science and Engineering, vol. 47, No. 3-4, 2005, pp. 209-217.
Thomeer, "Introduction of a pore geometrical factor defined by the capillary pressure curve" Journal of Petroleum Technology, vol. 12, No. 3, Mar. 1960, pp. 73-77.
Thompson, "Fractals in rock physics" Annual Review of Earth and Planetary Sciences, vol. 19, 1991, pp. 237-262.
Tlike, et al, "Quantitative analysis of porosity heterogeneity: Application of geostatistics to borehole images" Mathematical Geology, vol. 38, No. 2, Feb. 2006, pp. 155-174.
Tomutsa, et al, "Focused Ion beam assisted three-dimensional rock imaging at submicron scale" International Symposium of the Soc. of Core Analysis, Pau, France, Sep. 21-24, 2003, Paper SCA2003-47, 6 pages.
Tomutsa, et al, "Analysis of chalk petrophysical properties by means of submicron-scale pore imaging and modeling" SPE Reservoir Evaluation and Engineering, vol. 10, Jun. 2007, pp. 285-293.
Vahrenkamp, et al, Multi-scale heterogeneity modeling in a giant carbonate field, northern Oman (abs.): GeoArabia, vol. 13, No. 1, p. 248.
Vincent, "Watersheds in digital spaces: An efficient algorithm based on immersion simulations" IEEE Transactions on Pattern Analysis and Machine Intelligence, vol. 13, No. 6, Jun. 1991, pp. 583-598.
Vinegar, "X-ray CT and NMR Imaging of rocks" JPT, Mar. 1986, pp. 257-259.
Wardlaw, "Pore geometry of carbonate rocks as revealed by pore casts and capillary pressure" AAPG Bulletin, vol. 60, No. 2, Feb. 1976, pp. 245-257.
Wardlaw et al, "The effects of pore structure on displacement efficiency in reservoir rocks and in glass micromodels", SPE 8843,

(56) References Cited

OTHER PUBLICATIONS presented at the First Joint SPE/DOE Symposium on Enhanced Oil Recovery at Tulsa, Oklahoma, Apr. 20-23, 1980.

Washburn, "The dynamics of capillary flow" Physical Review, vol. 17, No. 3, Mar. 1921, pp. 273-283.

Wellington, et al, "X-ray computerized tomography" JPT, Aug. 1987, pp. 885-898.

Wikipedia, 2010a, website http://en.wikipedia.org/wiki/Confocal_microscopy, accessed on Oct. 31.

Wikipedia, 2010b, website http://en.wikipedia.org/wiki/Two-photon_excitation_mioroscopy, accessed on Oct. 23.

Williams, et al, "Assessment and interpretation of electrical borehole images using numerical simulations" The Log Analyst, vol. 38, No. 6, Nov.-Dec. 1997, pp. 34-44.

Withjack, et al, "The role of X-ray computed tomography in core analysis" SPE 83467, presented at the Western Region/AAPG Pacific Section Joint Meeting, Long Beach, CA, May 19-24, 2003, 12 pages.

Wu, et al, "3D stochastic modeling of heterogeneous porous media—Applications to reservoir rocks" Transport in Porous Media, vol. 65, 2006, pp. 443-467.

Wu, et al, "Validation of methods for multi-scale pore space reconstruction and their use in prediction of flow properties of carbonate" Paper SCA2008-34, International Symposium of the Society of Core Analysis, Abu Dhabi, Oct. 29-Nov. 2, 2008, 12 pages.

Xiao, et al, "Fully integrated solution for LWD resistivity image application a case study from Belbu Gulf, China" 1st SPWLA India Regional Conference, Formation Evaluation in Horizontal Wells, Mumbai, Mar. 19-20, 2007, 10 pages.

Ye, et al, "Automatic high resolution texture analysis on borehole imagery" Transactions of the SPWLA Annual Logging Symposium, May 1998, pp. M1-M14.

Yuan, et al, "Resolving pore-space characteristics by rate-controlled porosimetry" SPE Formation Evaluation, vol. 4, No. 1, Mar. 1989, pp. 17-24.

Zemanek, et al, "Formation evaluation by inspection with the borehole televiewer" Geophysics, vol. 35, No. 2, Apr. 1970, pp. 254-269.

Zhang, et al, "Pore scale study of flow in porous media: Scale dependency, REV, and statistical REV" Geophysical Research Letters, vol. 27, No. 8, Apr. 2000, pp. 1195-1196.

Adams, et al, "Strategies for dipmeter interpretation" Part 2: The Technical Review, vol. 35, No. 4, 1987, pp. 20-31.

Angulo, et al, "Fractal dimensions from mercury intrusion capillary tests" SPE 23695, Presented at the Second Latin American Petroleum Engineering Conference, Caracas, Venezuela, Mar. 8-11, 1992, pp. 255-263.

Anselmetti, et al, "Quantitative characterization of carbonate pore systems by digital image analysis" AAPG Bulletin, vol. 82, No. 10, Oct. 1998, pp. 1815-1836.

Bakke, et al, "3-D pore-scale modeling of sandstones and flow simulations in the pore networks" SPE 35479, vol. 2, European 3-D Reservoir Modeling Conference, held in Stavanger, Norway, Apr. 16-17, 1996, Jun. 1997, pp. 136-149.

Bakke, et al, "Pore scale modeling of carbonate reservoir rocks" Downloaded from website http://www.numericalrocks.com, Mar. 30, 2008, 13 pages.

Bear, J., "Dynamics of fluids in porous media" Elsevier, New York, pp. 13-26 and 38-57.

Behseresht, et al, "Infinite-acting physically representative networks for capillary-controlled displacements" SPE 110581, presented at the SPE Annual Technical Conference and Exhibition, Anaheim, CA, Nov. 11-14, 2007, 15 pages.

Bereskin, et al, "Carbonate microporosity: Recognizing its existence and understanding its role in hydrocarbon production", In Dolly, E. D., and Mullarkey, J. C., eds., Hydrocarbon Production from Low Contrast, Low Resistivity Reservoirs, Rocky Mountain and Midcontinent Regions: Log Examples of Subtle Pays: Rocky Mountain Association of Geologists Guidebook, Denver, Colorado, 1996, pp. 33-42.

Bigelow, "Making more intelligence use of log derived dip information. Part 1, Suggested guidelines" The Log Analyst, vol. 26, No. 1, pp. 41-53, 1985a.

Bigelow "Making more intelligent use of log derived dip information. Part 2, Website data gathering considerations" The Log Analyst, vol. 26, No. 2, pp. 25-41, 1985b.

Bigelow "Making more intelligent use of log derived dip information. Part 3, Computer processing considerations" The Log Analyst, vol. 26, No. 3, pp. 18-31, 1985c.

Bigelow "Making more intelligent use of log derived dip information. Part 4, Structural interpretation" The Log Analyst, vol. 26, No. 4, pp. 21-43, 1985d.

Bigelow "Making more intelligent use of log derived dip information. Part 5, Stratigraphic interpretation" The Log Analyst, vol. 26, No. 5, pp. 25-64, 1985e.

Bosi, et al, "A study of porosity and permeability using a lattice Boltzmann simulation" Geophysical Research Letters, vol. 25, No. 9, May 1998, pp. 1475-1478.

Bourke, "Core permeability imaging: It's relevance to conventional core characterization and potential application to wireline measurement" Marine and Petroleum Geology: vol. 10, Aug. 1993, pp. 318-324.

Bryant, et al, "Physically representative network models of transport in porous media" American Institute of Chemical Engineers Journal, vol. 39, No. 3, Mar. 1993, pp. 387-396.

Caers, et al, "Multiple-point geostatistics: A quantitative vehicle for integration of geologic analogs into multiple reservoir models", In M. Grammer, P. M. Harris and G. P. Eberil, eds.: Integration of Outcrop and Modern Analogs in Reservoir Modeling, AAPG. Memoir 80, 2004, pp. 383-394.

Cantrell, et al, "Microporosity in Arab Formation carbonates, Saudi Arabia" GeoArabia, vol. 4, No. 2, 1999, pp. 129-154.

Chen, et al, "What is the shape of pores in natural rocks?" Journal of Chemical Physics, vol. 116, May 2002, pp. 8247-8250.

Choquette, et al, "Geologic nomenclature and classification of porosity in sedimentary carbonates" AAPG Bulletin, vol. 54, No. 2, Feb. 1970, pp. 207-250.

Christie, M. A., Upscaling for reservoir simulation: JPT, SPE 37324, vol. 48, No. 11, Nov. 1996, pp. 1004-1010.

Clauset, et al, "Power-law distributions in empirical data" SIAM Review, vol. 51, No. 4, Feb. 2009, pp. 1-43.

Clerke, "Permeability, relative permeability, microscopic displacement efficiency, and pore geometry of M_1 bimodal pore systems in Arab D limestone" SPE Journal, vol. 14, No. 3, 2009, 8 pages.

Clerke, et al, "Application of Thomeer hyperbolas to decode the pore systems, facies and reservoir properties of the upper Jurassic Arab D limestone, Ghawar field, Saudi Arabia: A "Rosetta Stone" approach" GeoArabia, vol. 13, No. 4, 2008, pp. 113-116.

Coles, et al, "Developments in synchrotron X-ray microtomography with applications to flow in porous media" SPE 35531, presented at the SPE Annual Technical Conference and Exhibition, Denver, CO, Oct. 6-9, 1996, pp. 413-424.

Creusen, et al, "Property modeling small scale heterogeneity of carbonate facies" SPE 111451, Presented at Reservoir Characterization and Simulation Conference, Abu Dhabi, U.A.E., Oct. 28-31, 2007, 5 pages.

Davis, et al, "Image analysis of reservoir pore system: State of the art in solving problems related to reservoir quality" SPE 19407, presented at the SPE Formation Damage Control Symposium, Lafayette, Louisiana, Feb. 22-23, 1990, pp. 73-82.

Dehghani, et al, "Modeling a vuggy carbonate reservoir, McElroy Field, West Texas" AAPG Bulletin, vol. 83, No. 1, Jan. 1999, pp. 19-42.

Delhomme, "A quantitative characterization of formation heterogeneities based on borehole image analysis" Trans. 33rd Symposium SPWLA, Paper T, Jun. 1992, 25 pages.

Duey, R. "Quick analysis answers Heldrun question" Hart Energy Publishing, LP, accessed online at http://www.eandp.info/index2.php?area-article&articleid-767, Mar. 27, 2008, 4 pages.

(56) References Cited

OTHER PUBLICATIONS

Durlofsky, "Upscaling of geocellular models for reservoir flow simulation: A review of recent progress" presented at the 7th International Forum on Reservoir Simulation, Buhi-Baden, Germany, Jun. 23-27, 2003, 58 pages.
Dvorkin, et al, "Real time monitoring of permeability, elastic modull and strength in sands, and shales using Digital Rock Physics" SPE 82246, presented at the SPE European Formation Damage Conference, The Hague, Netherlands, May 13-14, 2003, 7 pages.
Ehrich, et al, "Petrographic image analysis, I. Analysis of reservoir pore complexes" Journal of Sedimentary Petrology, vol. 54, No. 4, Dec. 1984, pp. 1365-1378.
Fabbrl, "GIAPP: Geological image-analysis program package for estimating geometrical probabilities" Computer & Geosciences, vol. 6, No. 2, 1980, pp. 153-161.
Fredrich, et al, "Imaging the pore structure of geomaterials" Science, vol. 268, Apr. 1996, pp. 276-279.
Fredrich, "3D imaging of porous media using laser scanning confocal microsoopy with application to microscale transport processes" Physics and Chemistry of the Earth, Part A: Solid Earth and Geodesy, vol. 24, No. 7, 1999, pp. 551-561.
Fredrich, et al, "Predicting macroscopic transport properties using microscopic image data" Journal of Geophysical Research, vol. 111, 2006, 14 pages.
Fredrich, et al, "Predicting petrophysical properties using 3D image data (abs.)" AAPG Annual Convention, downloaded at http://www.aapg.org, 2007.
Gles, et al, "Petrographic image analysis: An effective technology for delineating reservoir quality" SPE 26147, presented at the SPE Gas Technology Symposium, Calgary, Alberta, Canada, Jun. 26-30, 1993, pp. 99-105.
Gilreath, Strategies for dipmeter interpretation: Part I: The Technical Review, vol. 35, No. 3, 1987, pp. 28-41.
Gomaa, et al, "Case study of permeability, vug quamtification, and rock typing in a complex carbonate" SPE 102888, presented at 81st Annual Technical Conference and Exhibition in San Antonio, Texas on Sep. 24-27, 2006, 11 pages.
Grace, et al, "Geological applications of dipmeter and Borehole electrical images" Short Course Notes, Schlumberger Olifield Services, vol. 8.1, 1998, 32 pages.
Greder, et al, "Determination of permeability distribution at log scale in vuggy carbonates" Paper BB, SPWLA 37th Annual Logging Symposium, Jun. 16-19, 1996, 14 pages.
Guardiano, et al, "Multivariate geostatistics: Beyond bivarate moments" Geostatistics-Trola, A. Soares. Dordrecht, Netherlands, Kluwer Academic Publications, vol. 1, 1993, pp. 133-144.
Harris, "Delineating and quantifying depositional facies patterns in carbonate reservoirs: insight from modern analogs" AAPG Bulletin, vol. 94, No. 1, Jan. 2010, pp. 61-66.
Hartmann, et al, 1999, "Predicting Reservoir System Quality and Performance" in Beaumont E. A. and N.H. Foster, eds., AAPG Treatise of Petroleum Geology/Handbook of Petroleum Geology: Exploring for Oil and Gas Traps, Chapter 9, 1999, pp. 9-1 to 9-154.
Hassail, et al, "Comparison of permeability predictors from NMR, formation image and other logs in a carbonate reservoir" SPE 88683, presented at the Abu Dhabi International Petroleum Exhibition and Conference, Abu Dhabi, U.A.E., Oct. 10-13, 2004, 13 pages.
Hocker, et al, "Use of dipmeter data in clastic sedimentological studies" AAPG Bulletin, vol. 74, No. 2, Feb. 1990, pp. 105-118.
Holt, "Particle vs. laboratory modeling in in situ compaction" Physics and Chemistry of the Earth, Part A: Solid Earth and Geodesy, vol. 26, Issue 1-2, 2001, pp. 89-93.
Hoshen, et al, "Percolation and cluster distribution—I. Cluster multiple labeling technique and critical concentration algorithm" Physcial Review B, vol. 14, No. 8, Oct. 15, 1976, pp. 3436-3445.
Huang, et al, "Super-resolution fluorescence microscopy" Annual Review of Biochemistry, vol. 78, 2009, pp. 993-1016.
Hurley, et al, "Quantification of vuggy porosity in a dolomite reservoir from borehole images and core, Dagger Draw Field, New Mexico" SPE 49323, presented at the SPE Annual Technical Conference and Exhibition, New Orleans, Louisiana, Sep. 27-30, 1998, 14 pages.
Hurley, "Flow unit determination in a vuggy dolomite reservoir, Dagger Draw Field, New Mexico" SPWLA Transactions, presented at the SPWLA 40th Annual Logging Symposium, Oslo, Norway, May 30-Jun. 3, 1999, 14 pages.
Hurley, "Borehole images" in Asqulth, G. and Krygowski, D.: Basic Well Log Analysis, 2nd Edition, AAPG Methods in Exploration Series No. 15, 2004, pp. 151-164.
Hurley, et al, "Method to generate fullbore images using borehole images and multi-point statistics" SPE 120671-PP, presented at the Middle East Oil & Gas Show and Conference, Bahrain, Mar. 15-18, 2009, 18 pages.
IReservoir, 2010, http://www.Ireservoir.com/case_jonah.html, accessed Oct. 10, 2 pages.
Jackson, et al, "Upscaling permeability measurements within complex heterolithic tidal sandstones" Mathematical Geology, vol. 35, No. 5, Jul. 2003, pp. 499-520.
Jackson, et al, "Three-dimensional reservoir characterization and flow simulation of heterolithic tidal sandstones" AAPG Bulletin, vol. 89, No. 4, Apr. 2005, pp. 507-528.
Jennings, "Capillary pressure techniques: Application to exploration and development geology" AAPG Bulletin, vol. 71, No. 10, Oct. 1987, pp. 1195-1209.
Kayser, et al, "Visualizing internal rock structures" Offshore, vol. 64, No. 8, Aug. 2004, pp. 129-131.
Kayser, et al, "A closer look at pore geometry" Oilfield Review, vol. 18, No. 1, 2006, pp. 4-13.
Knackstedt, et al, "Digital core laboratory: Properties of reservoir core derived from 3d images" SPE 87009, Presented at the Asia-Pacific Conference on Integrated Modeling for Asset Management, Mar. 29-30, 2004, 14 pages.
Kuglin, et al, 1975, "The phase correlation image alignment method" Proceedings of the IEEE, International Conference on Cybernetics and Society, Palo Alto, CA, 1975, pp. 163-165.
Kuwahara, et al, 1976, "Digital processing of biomedical images" Plenum Press, 1976, pp. 187-203.
Kyprlanidis, et al, "Image and video abstraction by anisotropic kuwahara filtering" Pacific Graphics, vol. 26, No. 7, 2009, pp. 1955-1963.
Lasseter, et al, "Reservoir heterogeneities and their influence on ultimate recovery" in Lake, L. W., and Carroll, H. B., Jr., eds., Reservoir Characterization: Academic Press, Orlando, Florida, 1986, pp. 545-559.
Leduc, et al, "FMI" based sedimentary facles modeling, Surmont Lease (Athabasca, Canada) (abs.): CSPG Annual Convention, Calgary, Alberta, Canada, Jun. 3-7, 2002, 10 pages.
Levy, et al, "Geomorphology of carbonate systems and reservoir modeling: Carbonate training images, FDM cubes, and MPS simulations" (abs.):AAPGAnnual Convention, Long Beach, California, Apr. 1-4, 2007a, http://searchanddiscovery.com/ documents /2008/ 08054levy/index.htm (accessed Jul. 15, 2008) 6 pages.
Levy, et al, "Importance of facles-based earth models for understanding flow behavior in carbonate reservoirs" (abs.): AAPG Annual Convention, Long Beach, California, Apr. 1-4, 2007b, http://searchanddiscovery.com/documents/2008 /08097harris25a/ index.htm (accessed Sep. 5, 2008) 25 pages.
Li et al, "Investigation of the asphaltene precipitation process from Cold Lake bitumen by confocal scanning laser microscopy" SPE 30321, Presented at the International Heavy Oil Symposium, Calgary, Alberta, Canada, Jun. 19-21, 1995, pp. 709-716.
Li, "Characterization of rock heterogenelty using fractal geometry" SPE 86975, Presented at SPE International Thermal Operations and Heavy Oil Symposium and Western Regional Meeting, Mar. 16-18, 2004, Bakersfield, California, 7 pages.
Mandelbrot, "How is the coast of Britain? Statistical self-similarity and fractional dimesion" Science, vol. 156, 1967, pp. 636-638.
Marrett et al, "Extent of power law scaling for natural fractures in rocks" Geology, vol. 27, No. 9, Sep. 1999, pp. 799-802.

(56) References Cited

OTHER PUBLICATIONS

Marzouk et al "Geologic controls on wettability of carbonate reservoirs, Abu Dhabi, U.A.E." SPE 29883, presented at the SPE Middle East Oil Show, Kingdom of Bahrain, Mar. 11-14, 1995, pp. 449-450.
Mathis, et al, "From the geologists' eyes to synthetic core descriptions: Geological log modeling using well-log data (abs.)" AAPG Annual Meeting, Salt Lake City, UT, May 2003, 7 pages.
Mell, B. Analytical report Nanovea—061213-21: Microphotonics internal report, Dec. 13, 2006, 10 pages.
Menendez, et al, "Confocal scanning laser microscopy applied to the study of pore and crack networks in rocks" Computers & Geoscience, vol. 27, No. 9, 2001, pp. 1101-1109.
Microphotonics, 2009, http://www.nanovea.com/Proflometers, html, accessed Mar. 30, 2 pages.
Neal, et al, "Sequence stratigraphy—A global theory for local success" Oilfield Review, January Issue, 1993, pp. 51-62.
Nikon, 2009, http://www.microscopyyu.com/articles/confocal/index.html, access on Mar. 30, 2 pages.
Nix, et al, "New methods applied to the microstructure analysis of Messel Oil Shale: Confocal laser scanning microscopy (CLSM) and environmental scanning electron microscopy (ESEM)" Geology Magazine, vol. 140, No. 4, 2003, pp. 469-478.
Norris, et al, "The geological modeling of effective permeability in complex heterolithic facies" SPE 22692, Presented at the 66th Annual Technical Conference and Exhibition, Dallas, TX, Oct. 6-9, 1991, pp. 359-374.
O'Connor, et al, "Microscale flow modeling in geologic materials" Physics and Chemistry of the Earth, Part A: Solid Earth and Geodesy, vol. 24, Issue 7, 1999, 9 pages.
Okabe, et al, "Prediction of permeability for porous media reconstructed using multiple-point statistics" Physical Review E, vol. 70, 2004, pp. 066135-1-10.
Okabe, et al, "Pore space reconstruction using multiple-point statistics" Journal of Petroleum Science and Engineering, vol. 46, 2005, pp. 121-137.
Okabe, et al, "Pore space reconstruction of vuggy carbonates using microtomography and multiple-point statistics" Water Resources Research, vol. 43, 2007, W12602, 5 pages.
Okabe, et al, "Pore-scale heterogenity assessed by the lattice-Boltzmann method" International Symposium of the Soc. of Core Analysts, Trondhelm, Norway, Sep. 12-15, 2006 Paper SCA2006-44, 7 pages.
Olympus, 2009a, http://www.olympusconfocal.com/theory/confocalintro.htm, accessed on Mar. 30.
Olympus, 2009b, http://www.olympus-global.com/en/news/204a/nn040326ols3e.cfm , accessed on Mar. 30.
Oren et al, "Extending Predictive Capabilities to Network Models", SPE Journal Dec. 1998, pp. 324-336.
Oren, et al, "Process based reconstruction of sandstones and prediction of transport properties" Transport in Porous Media, vol. 46, 2002, pp. 311-343.
Paparl, et al, "Artistic edge and corner enhancing smoothing" IEEE Transactions on Image Processing, vol. 16, No. 10, Oct. 2007, pp. 2449-2462.
Pelford, et al, 2001, "Investigation of the petrophysical properties of a porous sandstone using confocal scanning laser microscopy" Petroleum Geoscience, vol. 7, No. 2, 2001, pp. 99-105.
Petromod, 2010, http://www.les.de/, accessed Oct. 10, 2 pages.
Pittman, et al, "Use of pore casts and scanning electron microscope to study pore geometry" Journal of Sedementary Petrology, vol. 40, No. 4, Dec. 1970, pp. 1153-1157.
Pittman, "Microporosity in carbonate rocks" AAPG Bulletin, vol. 55, No. 10, Oct. 1971, pp. 1873-1881.
Pittman, "Relationship of porosity and permeability to various parameters derived from mercury injection-capillary pressure curves for sandstone" AAPG Bulletin, vol. 76, No. 2, Feb. 1992, pp. 191-198.
Liu et al., "Multiple-Point simulation integrating wells, three-dimensional seismic data, and geology," AAPG Bulletin, Jul. 2004, vol. 88(7): pp. 905-921.
Strebelle, "Sequential Simulation Drawing Structures from Training Images," Stanford University, Thesis for Doctorate of Philosophy, Nov. 2001: pp. 1-200.
International Search Report of PCT Application No. PCT/US2009/040198 dated Nov. 19, 2009: pp. 1-3.
International Search Report of PCT Application No. PCT/US2009/040210 dated Dec. 18, 2009: pp. 1-3.
International Search Report of PCT Application No. PCT/US2010/040363 dated Apr. 5, 2011: pp. 1-3.
International Search Report of PCT Application No. PCT/US2010/040378 dated Apr. 5, 2011: pp. 1-3.
International Preliminary Report on Patentability of PCT Application No. PCT/US2010/040378 dated Jan. 4, 2012: pp. 1-5.
Akbar et al., "A Snapshot of Carbonate Reservoir Evaluation," Oilfield Review, Winter 2000/2001: pp. 20-41.
Caers et al., "SPE 49026: Stochastic Reservoir Simulation Using Neural Networks Trained on Outcrop Data," SPE International, 1998: pp. 321-336.
Cha et al., "Nontranslational three-dimensional profilometry by chromatic confocal microscopy with dynamically configurable micromirror scanning," Applied Optics, Jun. 2000, vol. 39(16): pp. 2605-2613.
Coates et al., "NMR Logging Principles & Applications," Haliburton Energy Services, 1999: pp. 1-253.
Creath, "Surface Profilometry: State of the Art," 1992: pp. 2.1-2.20, <http://www.tesisenred.net/bitstream/handle/10803/6745/03CHAPTER2.pdf?sequence=3>.
Eaton, "On the importance of geological heterogeneity for flow simulation," Sedimentary Geology, 2006, vol. 184: pp. 187-201.
Geocosm, accessed Oct. 2010: pp. 1-5, <http://www.geocosm.net/>.
"Summary of FY 2008 Geosciences Research," U.S. Department of Energy, Nov. 2008: pp. 1-260.
Gonzalez et al., "SPE 111453: Development and Application of an Integrated Clustering/Geostatistical Approach for 3D Reservoir Characterization, SACROC Unit, Permian Basin," SPE International, 2007: pp. 1-41.
Gunter et al., "SPE 38679: Early Determination of Reservoir Flow Units Using an Integrated Petrophysical Method," SPE International, 1997: pp. 1-8.
Harris, "Delineating and quantifying depositional facies patterns in carbonate reservoirs: Insight from modern analogs," AAPG Bulletin, Jan. 2010, vol. 94(1): pp. 61-86.
Hornby et al., "Imaging of Near-Borehole Structure with the Array Sonic Tool," SEG Annual Meeting, Oct.-Nov. 1988: pp. 124-128.
Hurley et al., "Flow Unit Determination in a Vuggy Dolomite Reservoir, Dagger Draw Field, New Mexico," SPWLA 40th Annual Logging Symposium, May-Jun. 1999: pp. 1-14.
Inoue, "Chapter 1: Foundations of Confocal Scanned Imaging in Light Microscopy," Handbook of Biological Confocal Microscopy, Third Edition, SpringerScience+Business Media: New York, 2006: pp. 1-19.
Kim et al., "Three-Dimensional Tissue Cytometer Based on High-Speed Multiphoton Microscopy," Cytometry Part A, 2007, vol. 71A: pp. 991-1002.
Knackstedt et al., "SCA2006-23: 3D Imaging and Flow Characterization of the Pore Space of Carbonate Core Samples," International Symposium of the Society of Core Analysts, Sep. 2006: pp. 1-13.
Landa et al., "SPE 77430: Sensitivity Analysis of Petrophysical Properties Spatial Distributions, and Flow Performance Forecasts to Geostatistical Parameters Using Derivative Coefficients," SPE International, 2002: pp. 1-14.
Liu et al., "SPE 90643: Merging Outcrop Data and Geomechanical Information in Stochastic Models of Fractured Reservoirs," SPE International, 2004: pp. 1-10.
Montaron et al., "SPE 105041: A Quantitative Model for the Effect of Wettability on the Conductivity of Porous Rocks," SPE International, 2007: pp. 1-14.
Parra et al., "Wave attenuation attributes as flow unit indicators," The Leading Edge, Jun. 2002: pp. 564-572.

(56) References Cited

OTHER PUBLICATIONS

Phillips et al., "Measuring physical density with X-ray computed tomography," NDT & E International, 1997, vol. 36 (6): pp. 339-350.
Royo Royo, "Chapter 2: Surface profilometry: state of the art," Topographic measurements of non-rotationally symmetrical concave surfaces using Ronchi deflectometry, Universitat Politecnica de Catalunya d'Optica I Optometria, 1999: pp. 2.1-2.20, <http://hdl.handle.net/10803/6745>.
Wei et al., "Confocal white light profilometry as a tool for surface studies of paintings," Retrieved Jun. 12, 2009: pp. 1-2.
Wu et al., "SCA2007-16: Reconstruction of Multi-Scale Heterogeneous Porous Media and Their Flow Prediction," International Symposium of the Society of Core Analysts, Sep. 2007: pp. 1-12.
Zeiss, "LSM 700," Carl Zeiss MicroImaging GmbH, Dec. 2008: pp. 1-34.
Zhang, "Porous media reconstruction using a cross-section image and multiple-point geostatistics", ICACC International Conference pp. 24-29, 2009, Article No. 4777303.
Patent Cooperation Treaty, International Preliminary Report of Patentability for International Application No. PCT/US2010/040378, dated Apr. 5, 2012, 5 pages.
Inque, "Foundations of Confocal Scanned Imaging in Light Microscopy", Handbook of Biological Confocal Microscopy, Third Edition, SpringerScience + Business Media: New York, 2006, pp. 1-19.
Schindler, et al., "Quantification of vuggy porosity, Indian Basin field, New Mexico", Unpublished M.S. thesis, Colorado School of Mines, Golden, CO, 2005.
Tanprasat, "Petrophysical analysis of vuggy porosity in the Shu'aiba Formation of the United Arab Emirates", Unpublished M.S. thesis, Colorado School of Mines, Golden, CO, 2005.
Warlaw, "The Effects of Pore Structure of Displacement Efficiency in Reservoir Rocks and in Glass Micromodels", SPE 8843—SPE/DOE Symposium on Enhanced Oil Recovery, Apr. 1980, pp. 345-352.
Office Action issued in CN200980000258.9 on Apr. 18, 2013, 4 pages.
Office Action issued in CN200980000258.9 on Jul. 24, 2013, 4 pages.
Office Action issued in CN200980000258.9 on Jul. 31, 2012, 15 pages.
Gitman, I.M. et al., "Representative volume: existence and size determination", Engineering Fracture Mechanics, vol. 74, 2007, 2518-2545.
CN 2009800000258.9, Notification for the Grant of Invention Patent Right with Associate's Email, dated Jan. 28, 2014, 8 pages.
CN200980000184.9, Notice of Allowance dated Nov. 6, 2012, 4 pages.
CN200980000184.9, Office Action dated Feb. 21, 2012, 6 pages.
GC 2010-16232, Examination Report, dated Dec. 31, 2014, 4 pages.
PCT/US2009/040198, Written Opinion dated Nov. 19, 2009, 4 pages.
PCT/US2010/040378, International Search Report & Written Opinion, dated Apr. 5, 2011.
PCT/US2012/027037, International Search Report and Written Opinion, dated Sep. 28, 2012, 8 pages.
RU2013143803, Decision on Grant (English translation), 8 pages.
RU2009135608, Decision on Grant, dated Aug. 29, 2011, 19 pages.
RU2013143803, Final Office Action, dated Dec. 19, 2014, 6 pgs.
Levy, et al., "Understanding Flow Behavior in Carbonate Reservoirs from Facies-Based Earth Models", AAPG and AAPG European Region Energy Conference and Exhibition, Athens, Greece, Nov. 18-21, 2007.
Min, Ki-Bok et al., "Determining the equivalent permeability tensor for a fractured rock masses using a stocastic REV approach: Method and application to the field data from Selafield, UK", Hydrogeology Journal, vol. 12, 2004, pp. 497-510.
Niemi, et al., "Hydraulic characterization and upscaling of fracture networks based on multiple-scale well test data", 2000, 18 pages.
Numerical Rocks, "http://www.numericalrocks.com".
Pranter, M. et al., "Scales of lateral petrophysical heterogeneity in dolomite lithofacies as determined from outcrop analogs: Implications for 3-D reservoir modeling", AAPG Bulletin, vol. 89, No. 5, 2005, pp. 645-662.
Rathod, A., "Petrophysical analysis of the Thamama Group, Abu Dhabi, U.A.E.", Unpublished M.Sc thesis, Colorado School of Mines, Golden, CO., 2003.
Serra, "Formation MicroScanner Image Interpretation", Schlumberger Educational Services, 1989, 117 pgs.
Strebelle, et al., "Modeling of a Deepwater Turbidite Reservoir Conditional to Seismic Data Using Multiple-Point Geostatistics", SPE 77425—SPE Annual Technical Conference and Exhibition, 2002.
Tweheyo, et al., "SCA2005-72: Pore Characterization, Relating Mining Permeability and CT-Scan Porosity of Carbonate Cores", International Symposium of the Society of Core Analysis, 2005, pp 1-7.
Zhang, et al., "An improved reconstruction method for porous media based on multiple-point geostatistics", International Forum on Porous Flow and Applications, Apr. 2009, pp. 653-659.
Zhang, "Multiple-point simulation of multiple reservoir facies", Unpublished M.S. thesis, Stanford University, California, 2002, 163 p.
Zhang, Ting et al., "ICACC International Conference", 2009, pp. 24-29.
Guerillot, "From Geological modeling to flow simulation to forecast oil and gas reservoir production", New links between basic research and applied energy R&D, Berlin, No. 8-9, Nov. 2004, pp. 1-37.
Caers, "History Matching Under Training-Image Based Geological Model Constraints", Society of Petroleum Engineers Journal, Dallas, TX, SPE 74716, Sep. 1, 2003, pgs. 218-226.
EP Application No. 09730748.2, European Extended Search Report, dated Nov. 25, 2016, 8 pgs.

\* cited by examiner

3ft (1m)

3ft (1m)

METHOD FOR CHARACTERIZING A GEOLOGICAL FORMATION TRAVERSED BY A BOREHOLE

FIELD OF THE INVENTION

This invention relates broadly to the investigation of geological formations traversed by a borehole. More particularly, this invention relates to a method for characterizing a geological formation providing 360-degree views of the borehole wall.

BACKGROUND OF THE INVENTION

Electrical and acoustic borehole-imaging tools are widely used to log subsurface boreholes to locate and map the boundaries between rock layers (i.e., bed boundaries), and to visualize and orient fractures and faults Electrical borehole images run in water-based mud, such as Schlumberger's FMI (Formation MicroImager) log, are based on dipmeter technology that has been commercially available since the 1950's (Bigelow, 1985a, b, c, d, e; Gilreath, 1987; Adams et al., 1987; Hurley, 2004). FIG. 1 is an illustration of the tool configuration and basic principles behind dipmeter logs. Electrical borehole-imaging tools are, in essence, sophisticated dipmeters. The imaging tools have micro resistivity electrodes arranged around the wellbore on pads that are pressed against the borehole wall. The evolutionary trend from dipmeters to borehole images has been from a few electrodes to complex arrays of electrodes on multiple pads (between 4 to 6 pads, with or without flaps).

The data acquisition sequence for these tools generally runs as follows. Tools are first run into the hole with the pads closed. At the start of the log run, either four, six, or eight pads are pressed against the borehole wall. The number of pads depends on the logging device which is being used. Electrical current is forced into the rock through the electrodes, and remote sensors measure the current after it interacts with the formation (FIG. 2). Raw data include multiple electrode readings, calliper readings from individual pads or pairs of pads, and x-, y-, and z-axis accelerometer and magnetometer readings. Borehole deviation and the first pad (pad 1 for the tool) orientation are determined from the magnetometers. The sample rate for electrode and accelerometer data can be high, of the order of 120 samples/ft (400 samples/m).

Areal coverage of the borehole face is a function of width of the electrode arrays, number of pads, and borehole diameter. In general, 40 to 80% of the borehole face is imaged in typical boreholes. Non-imaged parts of the borehole appear as blank strips between the pads on the resulting borehole log.

Depth of investigation is small, generally less than 1 in (2.5 cm) into the formation (Williams, C. G., Jackson, P. D., Lovell, M. A., and Harvey, P. K., 1997, Assessment and interpretation of electrical borehole images using numerical simulations: The Log Analyst, v. 38, No. 6, p. 34-44). Logging rate, which is comparable to other openhole logs, is 1,600 to 1,800 ft/hr (500 to 550 m/hr). Pressure and temperature limitations are comparable to those placed on conventional logging tools.

Typically, a processed electrical borehole image is basically a map of resistivity of the rock-fluid system at the borehole face. Because it is more difficult to examine borehole images in 3-D, it is common to split the borehole along true north, then unroll the cylinder until it becomes a 2-D view. FIG. 3 represents the schematic diagram of a vertical, cylindrical borehole intersected by a planar feature such as a steeply dipping fracture. The intersection between the plane and the cylinder is either a circle or an oval. To view the borehole in two dimensions, the cylinder is generally cut along a line with an azimuth of true north (N). When the cylinder is flattened, the line of intersection of an oval trace becomes a sinusoidal curve. In highly deviated and horizontal wells, it is common to split the borehole image along the top of the hole. Planar features that intersect the cylindrical borehole appear as sine waves in the 2-D view.

Data processing is done on workstation, PC, or mainframe computers using commercially available software. Processing steps involve correcting the directional data, that is, first pad (pad 1) azimuth (tool orientation) and hole azimuth, for magnetic declination. Some programs also correct for magnetic inclination. Note that magnetic declination varies with time and space. Charts and computer programs are available to compute magnetic declination for any location in the world on any logging date. Next, accelerometer corrections are applied, making sure that the accelerometer curve is depth matched with the resistivity traces. The accelerometer accounts for differential sticking, speed variations, and resonant vibrations that occur as the tool moves up the hole. Finally, resistivity traces must be depth shifted using physical tool specifications, so that different rows of buttons are in line where the same slice of the borehole, perpendicular to the tool, was imaged. At very small scales (less than 6 in; 15 cm), nonlinear depth shifts occur that may not be correctable by conventional data-processing algorithms. As a result, not every surface that shows electrical contrast is exactly on depth.

Typically, borehole images are created by assigning colour maps to different bins or ranges of resistivity values. Colour pixels are then arranged in their proper geometric position around the wellbore. By convention, low-resistivity features, such as shales or fluid-filled fractures, are displayed as dark colours. High-resistivity features, such as sandstones and limestones, are displayed as shades of brown, yellow, and white (FIG. 4, representing small-scale fault, or microfault (M), and bed boundaries (B) in a sand and shale interval). Note the images can also be on gray scale wherein black corresponds to low resistivity and white to high resistivity. The shales occur in the lower part of the section. Examples for creating borehole images can be found in U.S. Pat. Nos. 3,406,776, 4,567,759 and 5,200,705.

Two main types of processed borehole images are available: static and dynamic. Static images are those which have had one contrast setting applied to the entire well. They provide useful views of relative changes in rock resistivity throughout the borehole. Static images can be calibrated in ohm-m to devices such as the Schlumberger's LLS log (Shallow Latero-log), a shallow-reading resistivity log. With normal processing, borehole images are uncalibrated. Images can be corrected for EMEX voltage, a background voltage that is adjusted on the logging truck to improve image quality. Dynamic images, which have had variable contrast applied in a moving window, provide enhanced views of features such as vugs, fractures, and bed boundaries. Dynamic images bring out subtle features in rocks that have very low resistivities, such as shales, and very high resistivities, such as carbonates and crystalline rocks. U.S. Pat. No. 5,809,163, herein incorporated by reference, relates to the analysis of textural features, specifically vugs, using borehole images.

High mud resistivities (greater than 50 ohm-m), typical of oil-based muds, are unsuitable for most electrical borehole images. Since 2001, Schlumberger's OBMI (Oil-Base MicroImager), has been available for oil-based muds. This tool generates borehole images by passing electrical current into the formation from two large electrodes on each pad, which is at a high voltage (about 300V). There is a series of closely spaced buttons, located in two rows of 5 on each of the 4 pads. Borehole images are generated from the potential difference (voltage drop) between the closely spaced electrodes. Wide gaps, corresponding to non-imaged parts of the borehole, are common between pads. This problem can be partially addressed by using 2 passes of the OBMI. An alternative is to use the Dual OBMI, a tool string with 2 OBMI tools mounted adjacent to each other, with the pads of one tool rotated with respect to the other.

Borehole images can be acquired during drilling (LWD, logging-while-drilling). Examples of Schlumberger logging tools are the GVR (GeoVision Resistivity) and ADN (Azimuthal Density Neutron) tools. The GVR uses rotating electrodes, and works in water-based mud. The ADN generates images from azimuthal density readings, and works in any mud. Borehole coverage is complete, with no gaps. However, downward-facing results are generally more reliable because of minimized tool standoff from the borehole wall.

Acoustic borehole images, also known as borehole televiewers, are based on technology first developed in the 1960's (Zemanek, J., Glenn, E. E., Norton, L. J., and Caldwell, R. L., 1970, Formation evaluation by inspection with the borehole televiewer: Geophysics, v. 35, p. 254-269). The UBI (Ultrasonic Borehole Imager) is Schlumberger's primary acoustic tool for open-hole applications. The UBI tool, which is centralized in the well, has a rotating transducer that emits and records sound waves that bounce off of the borehole wall. Both acoustic amplitude and travel time are recorded and processed into images. Normally, borehole coverage is 100%, with no gaps in the images. However, poor-quality images may result when the tool is decentralized, or the borehole wall is irregular.

Therefore, as discussed above, because electrical logging tools are pad-type devices with fixed arrays of electrodes, it is common to have gaps with missing information between the pads. Electrical and acoustic logs commonly have intervals with poor data quality due to non-functioning electrodes, insufficient pad pressure, borehole irregularities, rock debris, decentralized tools, and poor acoustic reflections.

Geostatistics is a discipline concerned with spatially distributed random variables (also called "regionalized variables"), usually applied to problems in the earth sciences, such as estimation of mineral reserves and delineation of mineral deposits, hydrocarbon reservoirs, and groundwater aquifers. Typically it makes use of two-point statistics summarized in a variogram. Multipoint (or multiple-point) geostatistics (MPS) differs from the rest of variogram-based geostatistics primarily in that it characterizes spatial variability using patterns (sets of points) that involve higher order (much greater than order 2) statistics.

Multipoint geostatistical methods have been demonstrated to be computationally feasible and have been tested on real datasets as set forth in i) Strebelle, "Conditional simulation of complex geological structures using multiple-point statistics", Mathematical Geology, v. 34, n. 1, 2002, pp. 1-22, ii) Strebelle et al., "Modeling of a deepwater turbidite reservoir conditional to seismic data using principal component analysis and multiple-point geostatistics," SPE Journal, Vol. 8, No. 3, 2003, pp. 227-235, and iii) Liu et al., "Multiple-point simulation integrating wells, three-dimensional seismic data, and geology," American Association of Petroleum Geologists Bulletin v. 88, no. 7, 2004, pp. 905-921.

Multipoint geostatistical methods use a numerical training image to represent the spatial variability of geological information. The training image provides a conceptual quantitative description of the subsurface geological heterogeneity, containing possibly complex multipoint patterns of geological heterogeneity. Multipoint statistics conditional simulation anchors these patterns to well data (and/or outcrop data) and to the seismic-derived information (and/or probability field information or constraint grid(s)). An example of such method is described in US-2007-0014435, assigned to Schlumberger Technology Corporation.

Geostatistics relies on the well-known concept of random variables. In simple terms, continuous or discrete properties at various spatial locations are largely unknown or uncertain; hence each property of interest at each spatial location is figured into a random variable whose variability is described by a probability function. In order to perform any type of geostatistical simulation, one requires a decision or assumption of stationarity. In multipoint geostatistical methods, the use of training images is bound by the principle of stationarity as described by Caers, J., and T. Zhang, 2004, "Multiple-point geostatistics: a quantitative vehicle for integrating geologic analogs into multiple reservoir models", in M. Grammer, P. M. Harris, and G. P. Eberli, eds., Integration of Outcrop and Modern Analogs in Reservoir Modeling, Memoir 80: Tulsa, Okla., AAPG. A random spatial field is said to be stationary if all of its statistical parameters are independent of location (invariant according to any translation). In the case of training images, this stationarity can consist of, but is not limited to, orientation stationarity, where directional elements do not rotate across the training image; and scale stationarity (where the size of elements on the image does not change across the training image).

One multipoint geostatistics method is well known in academia and industry by the name of "Single Normal Equation Simulation" (SNESIM) (Strebelle, S., 2000, "Sequential simulation drawing structures from training images, PhD thesis, Stanford University, 200p). The SNESIM method is generally considered useful for practical applications such as modeling categorical or discrete data types, especially for categorical data in 3D property modeling. In the SNESIM method, the conditional probability density function of all categories at one point is computed using knowledge of the value at a number of nearby points and statistics provided by the training image. SNESIM works with discrete values only (i.e., a finite and usually small number of categories, such as for example five different rock types).

Such methodology was well known in the early 1990's (before it was known as "SNESIM") (Guardiano, F., and R. M. Srivastava, 1993, Multivariate geostatistics: beyond bivariate moments, in A. Soares, ed., Geostatistics-Troia, v. 1: Dordrecht, Netherlands, Kluwer Academic Publications, p. 133-144). One of the limitations of the first MPS approach, however, was that it was extremely computationally intensive to consult the training image multiple times. In 2000, Strebelle developed a technique to store the information contained in the training image in a special tree-like structure that reduced computations enormously (Strebelle, S., 2000, Sequential simulation drawing structure from training images: PhD Thesis, Stanford University, Stanford, Calif., USA). With this improvement, the methodology was commonly referred to as the SNESIM method.

The SNESIM code is faster than Guardiano and Srivastava's (1993) original algorithm, but it is computer random-access memory (RAM) demanding, especially in 3D for a large training image. This RAM limitation in 3D requires compromises that may lead to inadequate shape reproduction of 3D objects. The RAM limitation also prevents from considering too many categories or classes jointly, thus limiting SNESIM to the simulation of categorical variables. The SNESIM algorithm searches for exact replicates of the conditioning data event, builds the reservoir model one pixel at a time, conditioned to a multiple-point data event, and does not allow any filtering or averaging of the patterns found in the training image.

In order to deal with both categorical and continuous variable training images and reduce RAM cost and improve shape reproduction in 3D applications, a new MPS algorithm named FILTERSIM (FILTER-based SIMulation) was proposed by Zhang and described and incorporated herein in Zhang et al. (Zhang T., Switzer P., and Journel A., 2006, Filter-based classification of training image patterns for spatial pattern simulation: Mathematical Geology, v. 38, p. 63-80). The FILTERSIM algorithm applies a set of local filters to the training image, which can be either categorical or continuous, to group local patterns into pattern classes. It then proceeds to simulate patterns on the basis of that classification. A filter is a local template (window) with a set of weights associated to each pixel location of the template. Applying a filter to a local pattern results in a filter score, the score is viewed as a numerical summary of that local pattern. A set of default or use-defined filters is designed such that each filter can record different aspects of the training pattern seen within the template. These filters are used to transform training patterns into a filter score space. This pattern scoring provides a remarkable dimension reduction of patterns. By partitioning that score space of limited dimension, similar training patterns are classified based on their filter scores.

The FILTERSIM algorithm starts with a classification of local training patterns in a filter score space of reduced dimension. Simulation proceeds along a sequential path through the simulation space, by determining which pattern class is most similar to the local conditioning data event, sampling a specific pattern from the pattern class, and then patching the sampled pattern onto the image at the simulation sites. The simulation random path and the sampling of patterns from pattern classes allow for different simulated realizations, yet all are conditional to the same original data. Because of the dimension reduction brought by the filter summaries of any pattern, and because patterns are grouped into classes, the algorithm is fast and reasonable in terms of RAM demand.

The SNESIM and FILTERSIM algorithms are able to honour absolute or so-called "hard" constraints from data acquired in wells or outcrops, and conditional or "soft" constraints from seismic data, facies probability fields, and rotation and affinity (or scale) constraint grids. All of these data are used in the stochastic modeling process to generate 1D, 2D, or 3D maps of geological facies or rock properties. Because there is a random component involved in MPS simulations, individual realizations of property fields created by MPS algorithms differ, but the ensemble of realizations provides geoscientists and reservoir engineers with improved quantitative estimates of the spatial distribution and uncertainty of geological facies in a modeled reservoir volume. Moreover, these algorithms honour both hard and soft input data constraints.

Directional 2D default colour filter may then be used according to the FILTERSIM algorithm (see an example in FIG. 5, showing 6 directional 2D filters wherein the $1^{st}$ and $2^{nd}$ filters are average filters; 3rd and $4^{th}$ are gradient filters; the $5^{th}$ and $6^{th}$ are curvature filters). There are three types of filters: average filter, gradient filter and curvature filter, and each type of filter is used for both horizontal and vertical directions. Average filters aim at localizing features; gradient filters are used to detect feature boundaries by highlighting the contrast of different features (the first-order difference); curvature filters supply the second-order difference of features.

FIG. 6 is a flowchart that summarizes the process involved in FILTERSIM simulations. In order to reflect large-scale structure, multi-grid simulation is used, which progressively simulates each level of the multi-grid from coarser to finer with the finer-grid simulation being constrained by previously simulated values at coarser grids. At each level of the simulation, rescaled filters are applied over the respective grid.

There are two types of training images: one with a very limited number of categories and another for continuous variables such as reservoir petrophysical properties. Multipoint geostatistical methods require 1D, 2D, or 3D grids of training images as prior conceptual geological models that contain patterns of the spatial attributes under study. The shapes of different features appearing on the images are supposed to represent a model of real geological features, with each category typically representing a different geological facies or different kind of geological body. Training images are typically required to contain "stationary" patterns, i.e., the patterns must be independent of their location in space (invariant according to any translation) and must be repetitive over the training image area. In the case of training images used for geological modeling, this stationarity can consist, but is not limited to, geological object orientation stationarity (where directional objects/features do not rotate across the image) and geological scale stationarity (where the size of objects/features on the image does not change across the image) (Caers, J. and Zhang, T., 2004, Multipoint geostatistics: A quantitative vehicle for integration of geologic analogs into multiple reservoir models, in M. Grammer, P. M. Harris and G. P. Eberli, eds.: Integration of Outcrop and Modern Analogs in Reservoir Modeling, AAPG. Memoir 80, p. 383-394).

An issue raised implicitly by current MPS algorithms is how to generate training images. Training images are supposed to model or reproduce real geological features and should as much as possible be derived from existing geologically meaningful images. This requires research on statistical and image-processing methods that will allow use of images from any source, e.g., hand-drawn sketches, aerial photographs, satellite images, seismic volumes, geological object models, physical scale models, or forward geological process models. Compared to the creation of continuously variable training images, generating categorically variable training images is easier. An object-based approach is commonly used to generate training images with categorical variables. A region-based approach, combined with adding desired constraints, can be used to generate continuously variable training images.

In particular, Multipoint geostatistics (MPS) is a new advanced geostatistics approach. It allows reservoir modelers to incorporate their prior knowledge, interpretations, or conceptual models into the reservoir modeling process through training images. These training images are numerical representations of the structures/features that are believed to exist in the reservoir under study. Once we have the training images, MPS can extract curvilinear structures or complex features from the training images and anchor them to the reservoir locations where the samples/observations are collected, leading to more realistic reservoir models. Introducing training images into reservoir modeling is a milestone. Note that there are two ingredients in the use of MPS: training images (conceptual models) and the real data (observations). These two pieces are typically separated.

However, in realistic applications, generating representative training images, in particular in 3D, has proved to be a bottleneck in MPS applications. Generating a continuous variable training image is even more difficult than the creation of categorical training image.

SUMMARY OF THE INVENTION

The invention significantly improves known methods for borehole imaging by providing, by non-limiting example, methods able to "fill the gaps" between the pads of borehole image logs with modeled images.

At least one embodiment of the invention can be based on processing an image of the borehole wall using a multi-point geostatistical model. According to at least one embodiment of the invention, each borehole imaging log can be directly taken as a training image.

According to embodiments of the invention, a method for characterizing a geological formation traversed by a first borehole. The method includes (a) retrieving one or more set of measured data provided by at least one measuring tool along one or more logged borehole length for one of the first borehole, at least one other borehole or both in order to produce a borehole imaging log; (b) selecting depth-defined intervals of the borehole imaging log as training images for inputting in a multi-point geostatistical model; (c) determining pattern based simulations for each training image using at least one pixel-based template of the multi-point geostatistical model so as to obtain training image patterns; (d) using the pattern based simulation of each training image to assign to each of the training image a corresponding training image pattern; (e) constructing from the training image patterns one or more fullbore image log of a borehole wall of the first borehole; and (f) repeat steps (b) to (e) through the one or more logged borehole length in order to construct fullbore images from successive, adjacent training images.

According to aspects of the invention, the invention may include the borehole imaging log having one of processed raw data that consists of measured values and non-measured values. Further, the borehole imaging log can include one of unidentified borehole image data or data gaps. Further still, the one of unidentified borehole image data or data gaps can be from the group consisting of one of at least one damaged pad in the reservoir, at least one damaged area in the reservoir, at least one pad with inadequate pad pressure against a borehole wall in the reservoir, at least one pad obstructed from contacting the borehole wall in the reservoir or at least one inoperable pad in the reservoir, electronic malfunctions from the measuring tool or other devices. It is possible the determined pattern based simulations for each training image can be used to group and then simulate patterns in the data gaps. Further, the one or more set of measured data can be from the group consisting of one of logging data having multiple depths of investigation, logging-while-drilling data, wireline logging data or some combination thereof.

According to aspects of the invention, the invention may include the constructed fullbore images includes plotting a digital file of the constructed fullbore images onto one of a digital media or hard copy media. Further, pattern based simulations can be use of filter scores. Further still, determining the filter scores for each training image can include a filtering process that uses the selected at least one pixel-based template as a filter that processes retrieved one or more set of measured data so as to detect training image patterns, then determines filter scores for each training image pattern. Further still, the training image patterns may be patterns of pixel associations within the training images that provide filter scores to the neighborhoods around each measured pixel. It is possible that the training images can be oriented as two-dimensional (2D) scalar arrays of continuously variable numerical values. Further, the one or more logged borehole length can be one of equal to or less than 1 foot, between 1 to 3 feet, or greater than 3 feet. Further still, constructing the fullbore images from successive, adjacent training images may include overlapping each adjacent selected depth-defined intervals of the borehole imaging log. Further, the fullbore image that has been processed using MPS modeling can allow for a drawing of closed contours around one of at least one dark color patch or at least one light color patch in the borehole images.

According to aspects of the invention, the invention may include the at least one dark color patch that represents one of electrically non-resistive regions, minimal amplitude of reflected acoustic waves, substantial travel time of reflected acoustic waves, minimal formation density, or some combination thereof. Further, the at least one light color patch may represent one of electrically resistive regions, substantial amplitude of reflected acoustic waves, minimal travel time of reflected acoustic waves, substantial formation density or some combination thereof.

According to embodiments of the invention, the invention may include a method using a multi-point geostatistical model for characterizing a geological formation traversed by a borehole. The method includes: (a) retrieving a set of measured data provided by at least one tool along depth-defined intervals of the borehole in order to produce a borehole imaging log; (b) selecting depth-defined intervals of the borehole imaging log as training images for inputting in a multi-point geostatistical model; (c) determining filter scores for each training image using a pixel-based template of the multi-point geostatistical model so as to obtain training image patterns; (d) classifying training image patterns based on their filter scores; (e) constructing from the training image patterns one or more fullbore image log of a borehole wall from the subterranean area; and (f) repeat steps (b) to (e) through the depth-defined intervals of the borehole in order to construct fullbore images from successive, adjacent training images.

According to aspects of the invention, the invention may include the one or more set of measured data being from the group consisting of one of logging data having multiple depths of investigation, logging-while-drilling data, wireline logging data or some combination thereof. Further, pattern based simulations may be used as filter scores. Further still, determining the filter scores for each training image may include a filtering process that uses the selected at least one pixel-based template as a filter that processes retrieved one or more set of measured data so as to detect training image patterns, then determines filter scores for each training image pattern. It is possible constructing the fullbore images from successive, adjacent training images can include overlapping each adjacent selected depth-defined intervals of the borehole imaging log.

According to embodiments of the invention, the invention may include a storage device readable by a machine and storing a set of instructions executable by the machine to perform method steps for characterizing a geological formation traversed by a borehole. The method includes: (a) retrieving a set of measured data provided by at least one oilfield application tool along depth-defined intervals of a reservoir in order to produce a borehole imaging log; (b) selecting depth-defined intervals of the borehole imaging log as training images for inputting in a multi-point geostatistical model; (c) determining filter scores for each training image using a pixel-based template of the multi-point geostatistical model so as to obtain training image patterns; (d) classifying training image patterns based on their filter scores; (e) constructing from the training image patterns one or more fullbore image log of a borehole wall from the reservoir; and (f) repeat steps (b) to (e) through the depth-defined intervals of the reservoir in order to construct fullbore images from successive, adjacent training images.

According to embodiments of the invention, the invention may include a method for characterizing a geological formation. The method includes: (a) retrieving one or more set of measured data provided by at least one tool along one or more geological area in order to produce at a portion of a complete geological image; (b) selecting defined intervals of the portion of the geological image as training images for inputting in a multi-point geostatistical model; (c) determining pattern based simulations for each training image using at least one pixel-based template of the multi-point geostatistical model so as to obtain training image patterns; (d) constructing from the training image patterns one or more complete geological image of the geological area; and (f) repeat steps (b) to (d) through the one or more geological area in order to construct complete geological images from successive, adjacent training images.

Additional advantages of the invention will become apparent to those skilled in the art upon reference to the detailed description taken in conjunction with the provided figures.

BRIEF DESCRIPTION OF THE DRAWINGS

The application file contains at least one drawing executed in color. Copies of this patent or patent application publication with color drawings will be provided by the Office upon request and payment of the necessary fee.

The present invention is further described in the detailed description which follows, in reference to the noted plurality of drawings by way of non-limiting examples of exemplary embodiments of the present invention, in which like reference numerals represent similar parts throughout the several views of the drawings, and wherein.

It will be recognized by the person of ordinary skill in the art, given the benefit of this disclosure, that certain dimensions, features, components, and the like in the figures may have been enlarged, distorted or otherwise shown in a non-proportional or non-conventional manner to facilitate a better understanding of the technology disclosed herein.

DETAILED DESCRIPTION OF THE INVENTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Figure 1:
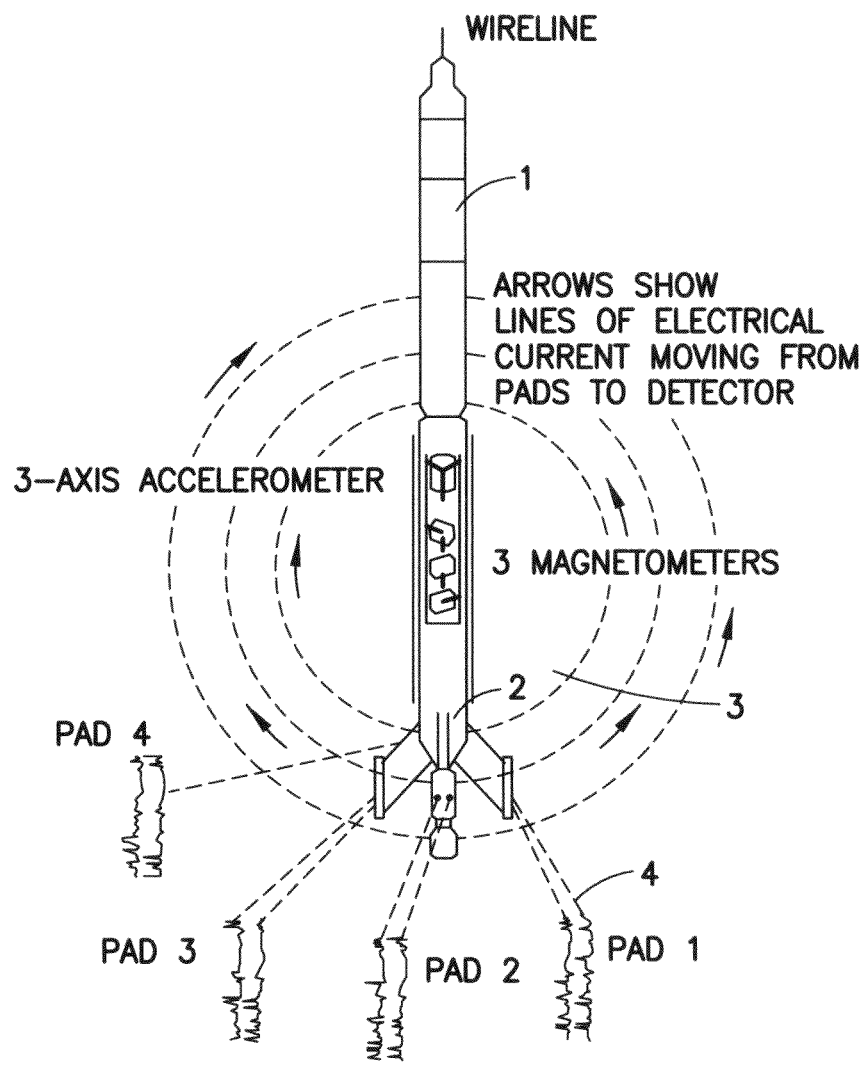
FIG. 1 is a diagram of Schlumberger's SHDT (Stratigraphic High Resolution Dipmeter Tool), illustrating known principles of electrical dipmeter tools.

FIG. 1 shows basic principles of electrical dipmeter tools with a diagram of Schlumberger's SHDT 1 (Stratigraphic High Resolution Dipmeter Tool), which became commercially available in 1982. Two measuring electrodes 2 on each of four pads 3 generate eight raw electrode traces 4, as shown at the bottom of the figure. Magnetometers—not shown—measure borehole deviation. Accelerometers—not shown—record high-frequency tool-speed variations which occur as the tool is being run. Formation dip is computed from planes that are fit through correlative peaks and troughs on the speed-corrected electrode traces. Calliper logs record borehole diameter between the four pads.

Figure 2:
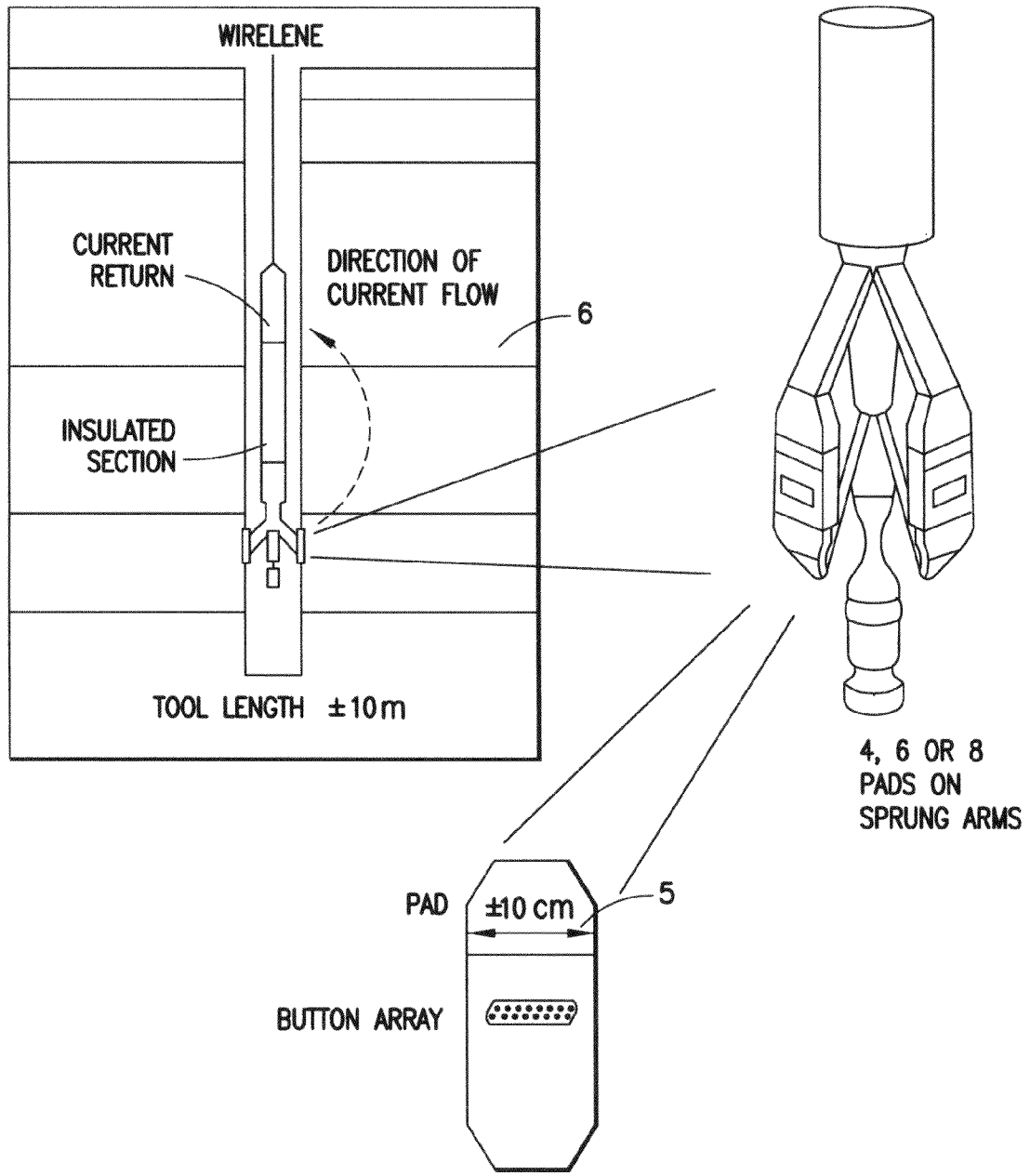
FIG. 2 is an example of basic elements of electrical borehole-imaging tools.
Figure 3:
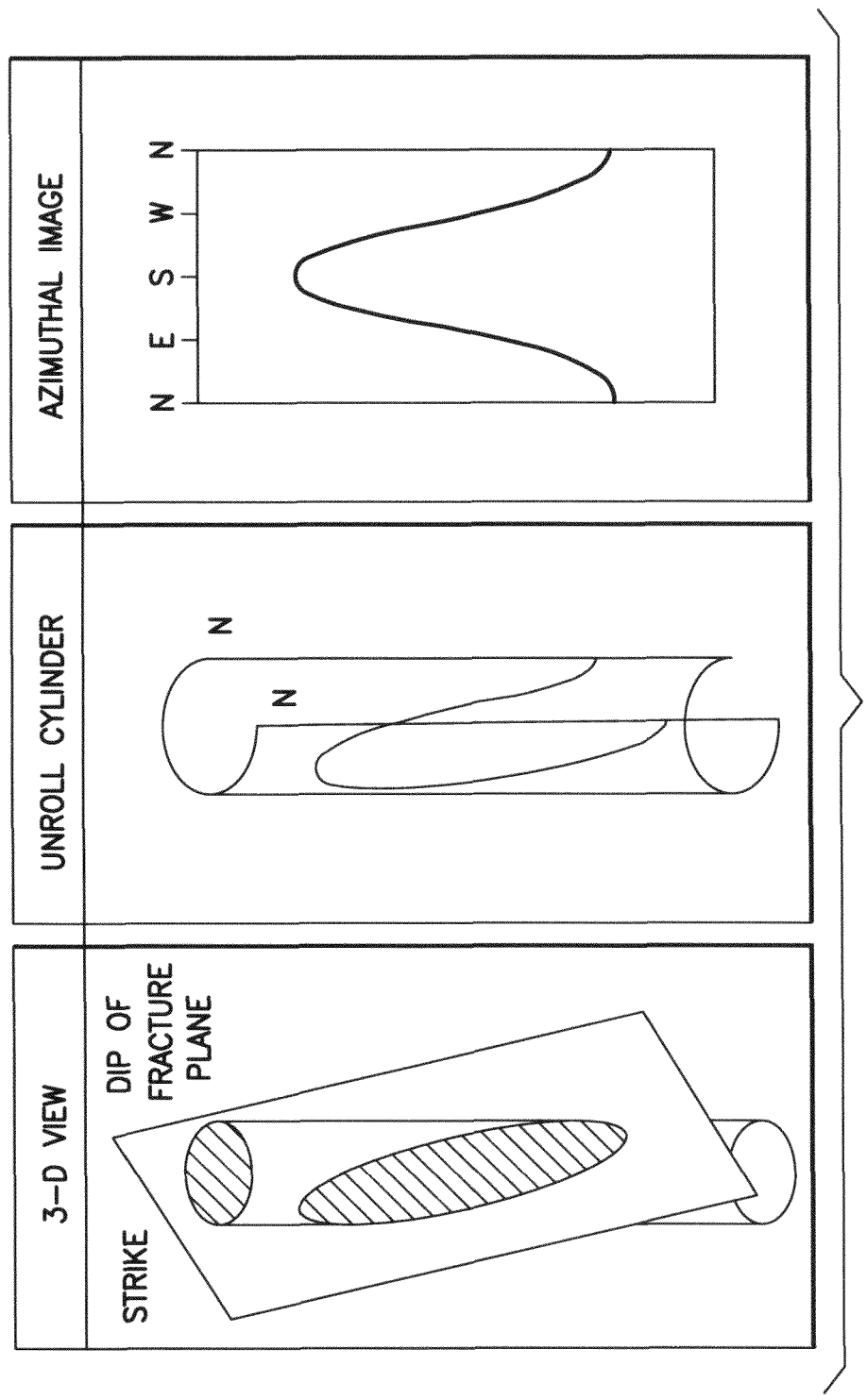
FIG. 3 is a schematic diagram of a vertical, cylindrical borehole intersected by a planar feature such as a steeply dipping fracture.
Figure 4:
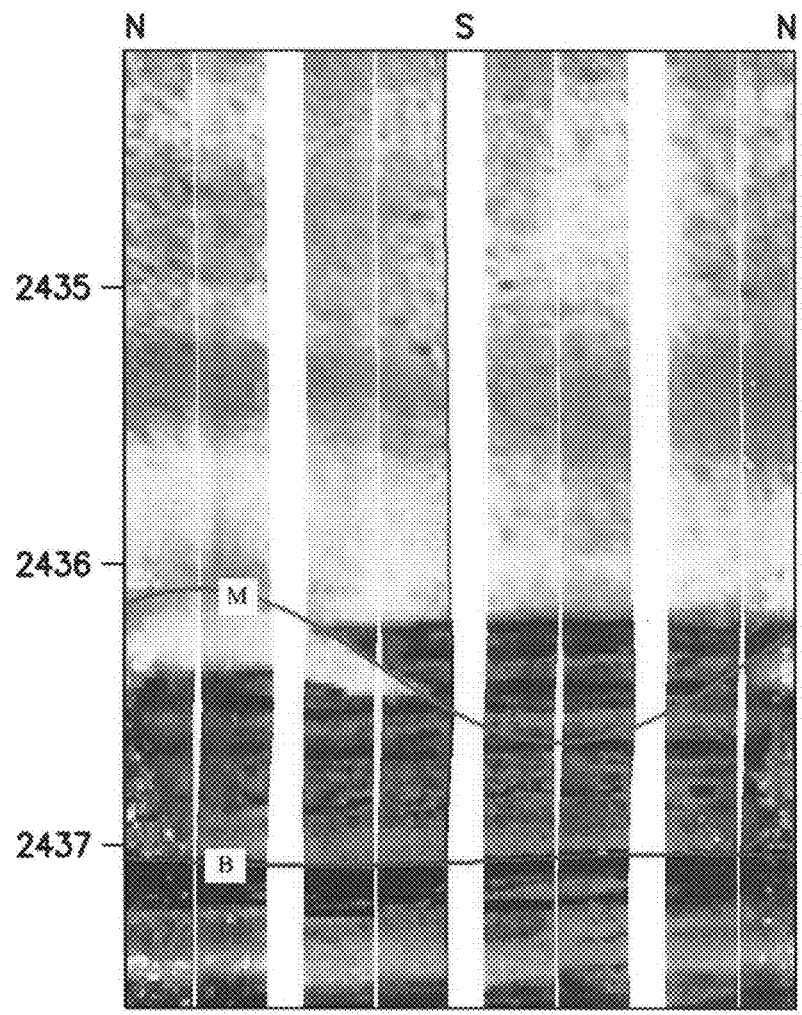
FIG. 4 is an example of a conventional borehole image.
Figure 5:
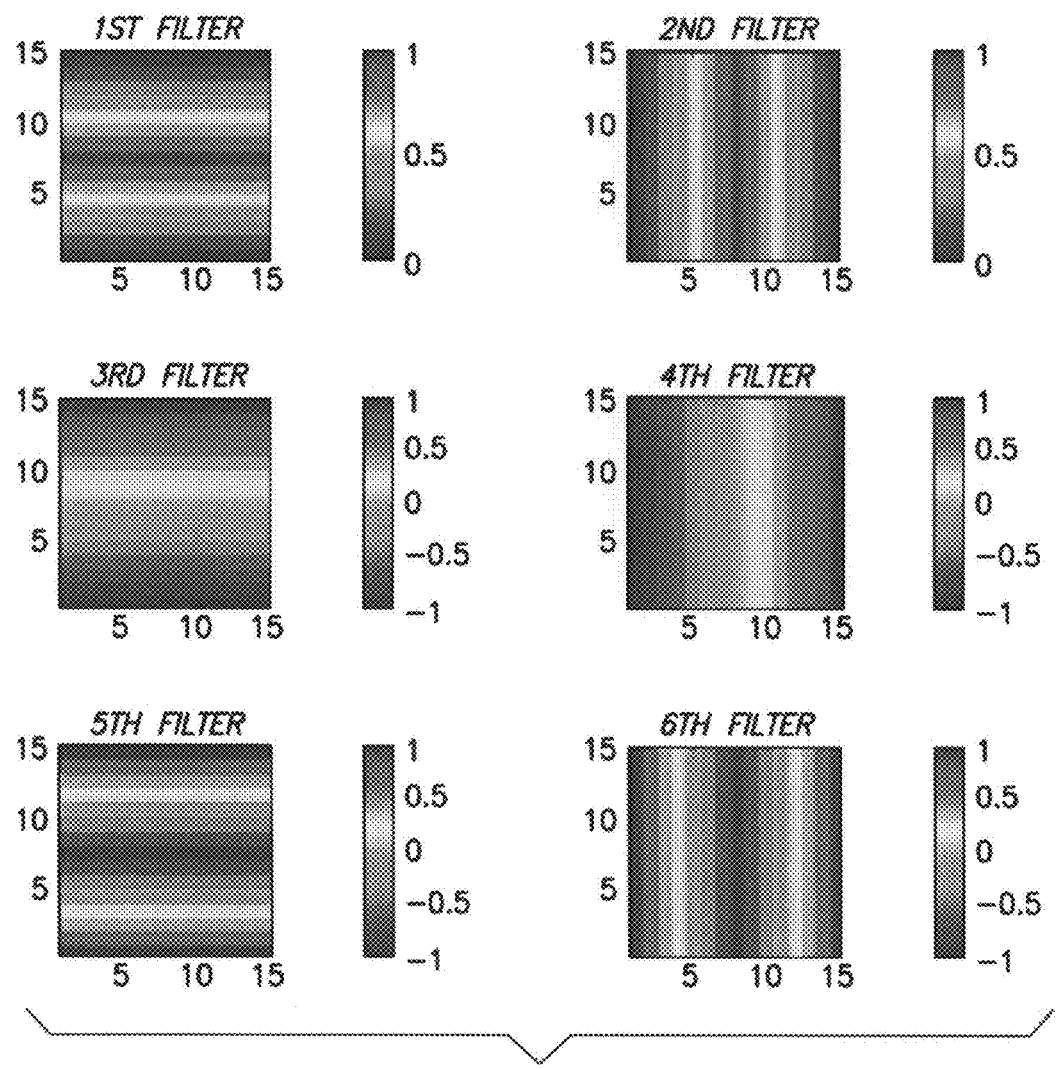
FIG. 5 is an example of six 2D directional default filters used in the FILTERSIM algorithm.

FIG. 2 represents basic elements of electrical borehole-imaging tools. Electrical currents pass through button arrays 5 into the formation 6. Current drop is recorded at a remote detector. Magnetometers—not shown—record borehole deviation, and accelerometers—not shown—record speed variations. The processed borehole image is a speed-corrected resistivity map of the borehole wall.

As explained earlier, electrical borehole images in water-based (conductive) and oil-based (non-conductive) muds are generated from electrodes arranged in fixed patterns on pads that are pressed against the borehole wall. Depending on the borehole diameter, gaps nearly always occur between the pads. Because of these gaps, it is common to have non-imaged parts of the borehole wall.

Fullbore Images are complete, 360-degree views of the borehole wall. The method according to the invention allows generating fullbore images by "filling in the gaps" between the pads of borehole-image logs. One exemplary embodiment of the method uses the FILTERSIM algorithm of multi-point statistics (MPS) to generate models or realizations. This exemplary algorithm is described in Zhang (Zhang T., Switzer P., and Journel A., 2006, Filter-based classification of training image patterns for spatial pattern simulation: Mathematical Geology, v. 38, p. 63-80). Measured (incomplete) borehole images themselves are used as "training images." Recorded data are perfectly honoured, i.e., the models are conditioned to the real data. Gaps are filled with patterns similar to those seen elsewhere in the log. Patterns in the gaps match the edges of the pads. The frequency distribution of continuously variable pixel colours in the gaps matches the distribution of pixel colours in the measured images. According to an aspect of the invention, the seminal idea lies in the use of training image: we directly use the data themselves [in fullbore creation, it is the original 2D incomplete image (continuous variable training image) that has >60% coverage of the entire region, while in the pseudocore reconstruction, the Catscan digital core is directly used as a 3D training image that is combined later with the fullbore image data]. Hence, the entire process of applying MPS becomes data-driven. This advantage should be stressed in our patent memo and provisions.

The fullbore images, as provided according to the method of the invention, facilitate visualization and interpretation of borehole-image logs. They can be used to draw closed contours around electrically resistive or non-resistive patches in the borehole wall (see FIG. 13). Fullbore Images can be used to repair logs with bad electrodes, low pad pressure, or poor acoustic reflections (see FIG. 14). Therefore, they can be used to improve any commercially available electrical or acoustic borehole images. The method according to the invention includes steps wherein the multi-point geostatistical (MPS) model combines lower-resolution, full-coverage images (such as acoustic logs or images generated using logging-while-drilling) with higher-resolution, partial-coverage logs (such as electrical borehole images in conductive and non-conductive mud) to produce modeled, high-resolution fullbore images.

The method according to the invention aims at generating fullbore images from electrical borehole-imaging logs. In one non limiting exemplary embodiment of the invention, the method includes the following steps:

Retrieving a set of measured data that are provided by a logging tool in order to produce a borehole-imaging log of the formation wall. In the image, the lateral dimension usually corresponds to the circumferential direction of the borehole and is limited to the angular sector covered by the array of electrodes that are mounted on the logging tool.

Use discrete, depth-defined intervals of borehole-imaging logs as training images for implantation of a multi-point geostatistical modeling step. The training images are oriented, 2-dimensional (2D) scalar arrays of continuously variable numerical values, with gaps between the pads. The pads represent measured values and the gaps are non-imaged parts of the borehole.

Determine filter scores for each training image using a suitable pixel-based template. These scores quantify the patterns and their probabilities, as observed in the measured data.

Figure 6:
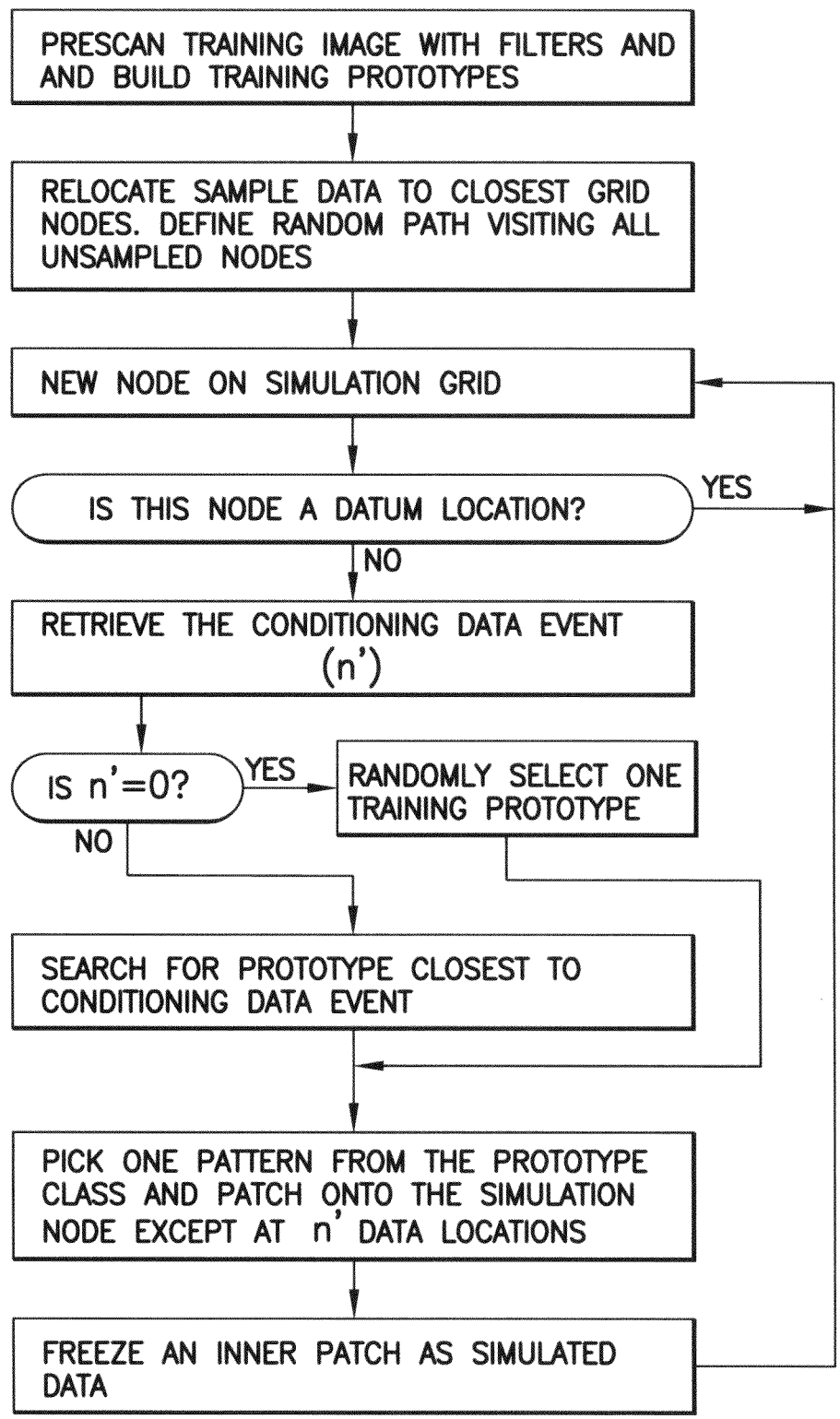
FIG. 6 shows an example of flowchart for the FILTERSIM algorithm.

Generate fullbore image realizations using the FILTERSIM algorithm of multi-point statistics model according to the flowchart as provided in FIG. 6.

Scroll progressively through the entire logged interval, generating fullbore images from successive, adjacent training images.

Select Training Images

In order to perform MPS simulation, the training images must be stationary. However, in most reservoir modeling applications, the geological sediments show non-stationary patterns/features, which reflect the reservoir heterogeneities and anisotropies of sedimentation.

Therefore, according to the invention, the training image that will be selected represents a depth-defined interval of the borehole-image log. For example, this interval could be 1, 3, or 10 ft (0.3, 1, or 3 m) of measured depth. The user may want to choose a thick or thin interval, depending on the observed amount of layering, fracturing, and other heterogeneous patterns.

Figure 7:
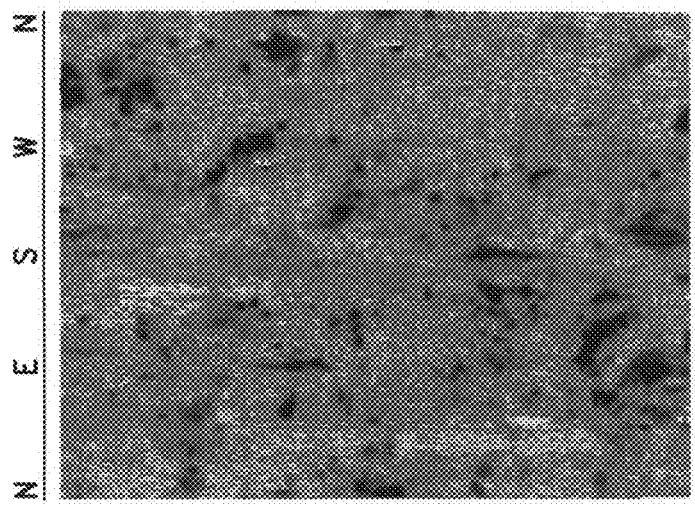
FIG. 7 shows an example of a 3-ft (1-m) interval of a borehole-image log in a vuggy carbonate formation.

FIG. 7 shows a 3-ft (1-m) interval of a borehole-imaging log in a vuggy carbonate formation. Vugs are large, irregular pores, visible to the naked eye. In a borehole-image log, vugs appear as dark spots because they are filled with water-based drilling mud, and they conduct electricity. This interval was chosen as a training image because the patterns look stationary. In training image of FIG. 7 is defined as 3-ft (1-m) interval of single-pass of a logging tool (like the Schlumberger Formation Micro Imager) in a vuggy carbonate formation. Vugs are pores that are filled with water-based drilling mud, and they appear as dark, low-resistivity spots. Note the gaps 7 between the pads.

For illustration, the pixel-based, user-defined 3×3 template 8 as showed at the bottom of FIG. 7 is moved through the training image, detecting patterns and giving filter scores to the neighbourhoods around each measured pixel. In one exemplary embodiment of this invention, this provides the basis for MPS simulation using the FILTERSIM algorithm of FIG. 6. However, FILTERSIM was taken as example of algorithm only. Other algorithms that perform pattern-based simulation using the original (incomplete) logged images as training images could replace FILTERSIM to create fullbore images.

Figure 8:
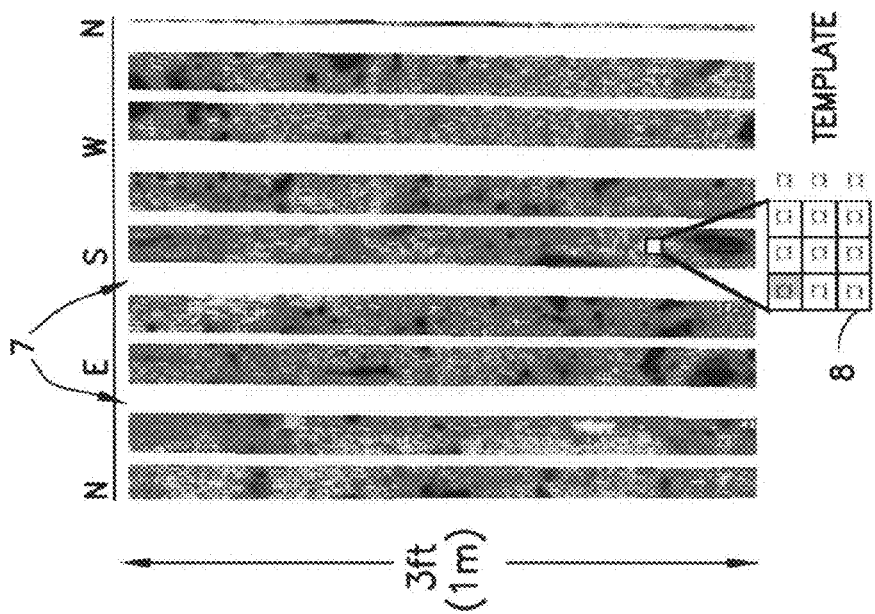
FIG. 8 shows the image shown on FIG. 7 after being treated with the method according to the invention.

FIG. 8 shows the fullbore image provided according to the method of the invention that uses the entire image of FIG. 7 as a training image. The realization is conditioned so that it perfectly matches the original, measured data. Orientations are shown along the tops of the images. Abbreviations: N=north; E=east; S=south; and W=west. The FIG. 8 exhibits no vertical exaggeration and bit size is 8.5 in (21.5 cm).

Determine Filter Scores Using a Suitable Template

Once the training image is selected, the method will determine filter scores to categorize and classify the observed patterns. To do this, the human user of the method according to the invention chooses a suitable template. For example, the template could be 3×3, 3×10, or 9×9 pixels. This template is used as a filter that moves through the measured data and records all possible patterns and assigns scores to them for further classification and simulation.

Generate Fullbore Image Realizations

Once filter scores are determined for each training image using a suitable pixel-based template, the method according to the invention uses these filter scores to group and then simulate patterns in the gaps between the pads, where no measured data exist. The approach for a single realization is to randomly occupy pixel locations, and draw from the set of filter scores to choose a suitable pattern for the random site. Measured data are perfectly honoured, because these are conditional simulations. Patterns adjacent to the edges of pads match the patterns observed on the actual pads. The frequency distribution of modeled pixel colours, a continuous variable, perfectly matches the frequency distribution of measured colours.

Figure 10:
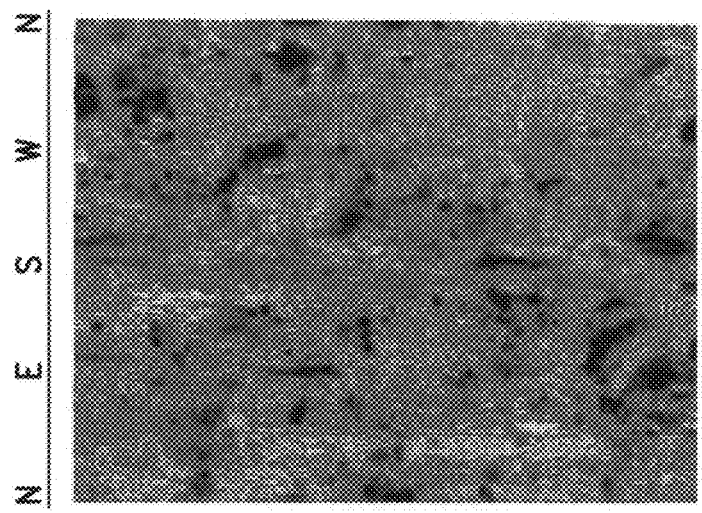
FIGS. 10 to 12 represent three different modeled fullbore images according to the invention, all of them matching the image of FIG. 9.
Figure 9:
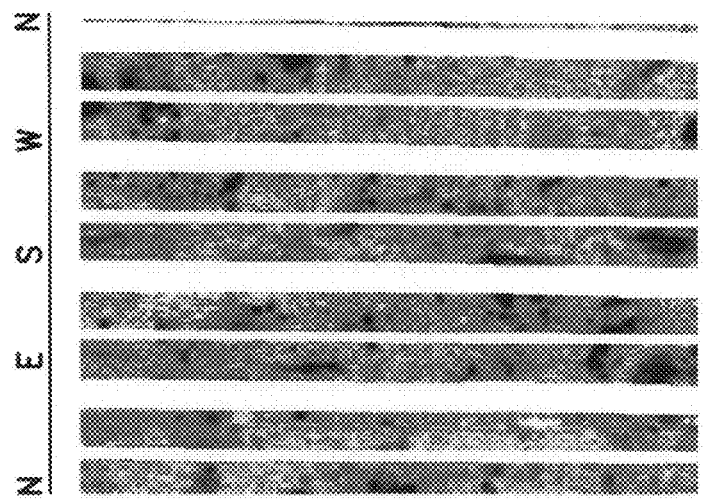
FIG. 9 shows an example of a 3-ft (1-m) interval of a borehole-image log in a vuggy carbonate formation as the one of FIG. 7.
Figure 12:
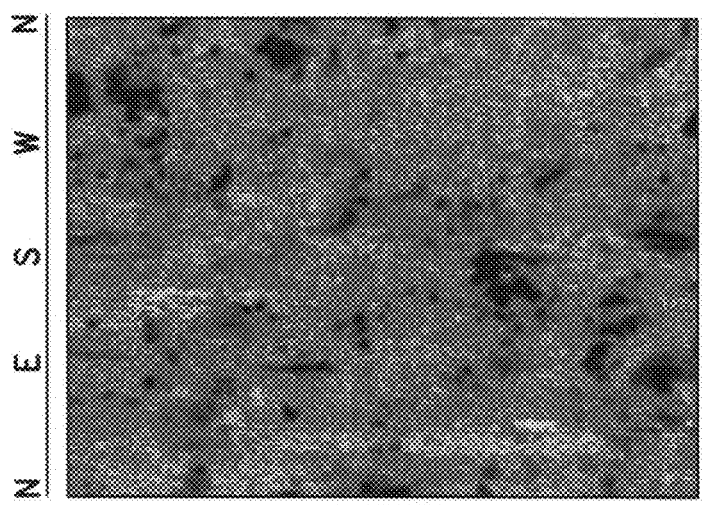
Figure 11:
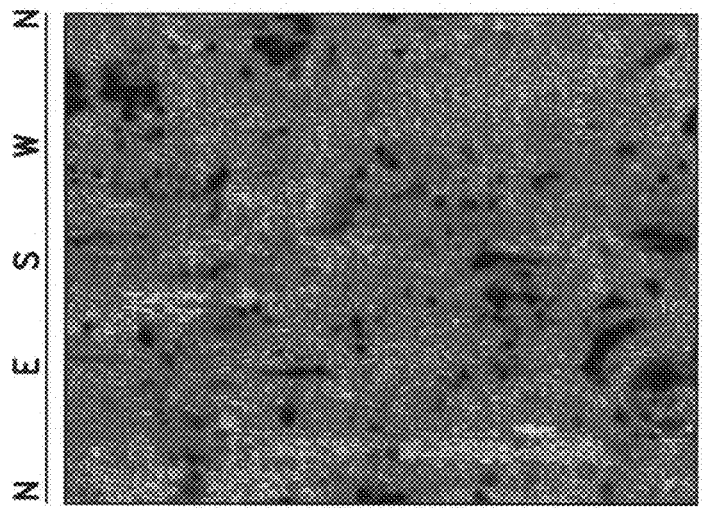

FIGS. 10 to 12 show examples of three realizations of a fullbore image in a vuggy carbonate formation according to the invention. The training image on FIG. 9 is comparable to the training image shown on FIG. 7. For all the fullbore images of FIGS. 10 to 12, the measured data are honoured but there are subtle variations in the modeled areas from one image to another. Orientations are shown along the tops of the FIG. 9 to 12, abbreviations are N=north; E=east; S=south; and W=west. These figures exhibit no vertical exaggeration and bit size is 8.5 in (21.5 cm).

Generate Continuous Fullbore Images Through the Entire Logged Interval

Sharp boundaries are undesirable when they occur between modeled fullbore images. Therefore, in an embodiment of the method according to the invention, it is possible to model adjacent depth-defined intervals with some amount of overlap. For example, the method according to the invention allows the human user to choose a 20% overlap between a modeled interval and the next interval up or down the hole. The results from the previously modeled interval are considered to be fixed or "hard" data, and the newly modeled interval is conditioned to match the "hard" data.

As described in Delhomme (Delhomme, J. P., 1992, A quantitative characterization of formation heterogeneities based on borehole image analysis: Trans. 33$^{rd}$ Symposium SPWLA, Paper T.) or Hassall et al. (Hassall, J. K., Ferraris, P., Al-Raisi, M., Hurley, N. F., Boyd, A., and Allen, D. F., 2004, Comparison of permeability predictors from NMR, formation image and other logs in a carbonate reservoir: SPE preprint 88683, presented at the 11$^{th}$ Abu Dhabi International Petroleum Exhibition and Conference, Abu Dhabi, U.A.E., 10-13 October) the importance of mapping electrically resistive and non-resistive patches in borehole images has been acknowledge. However, the approaches described in these publications are unsatisfactory because of gaps between the pads. Furthermore, these prior art approaches were unable to draw closed contours around regions of high or low resistivity because of uncertainty about the shapes.

Figure 13:
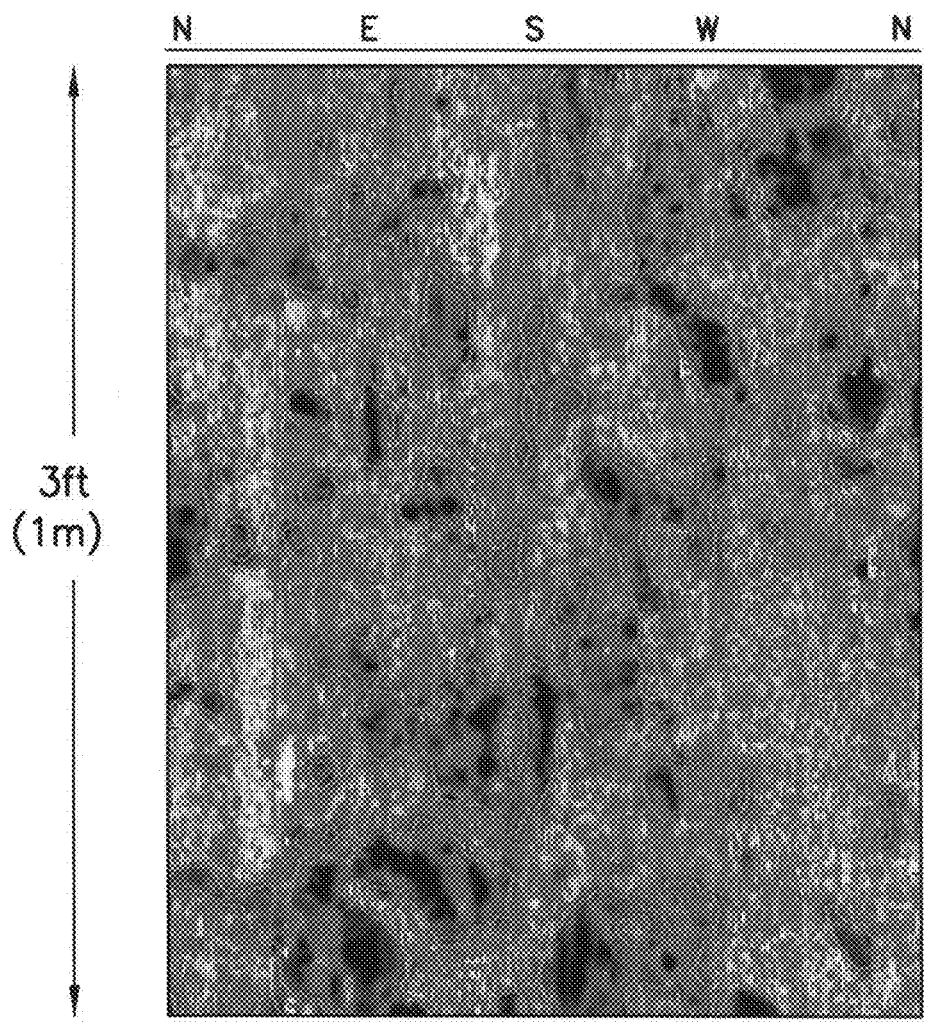
FIG. 13 represents a fullbore image of vuggy porosity according to the invention showing contours that outline the less-resistive areas in the electrical image.

As represented on FIG. 13, the fullbore image provided with the method according to the invention allows drawing closed contours around resistive and/or non-resistive regions in the borehole images. Such regions provide important measures of heterogeneity, especially in carbonate reservoirs.

Figure 15:
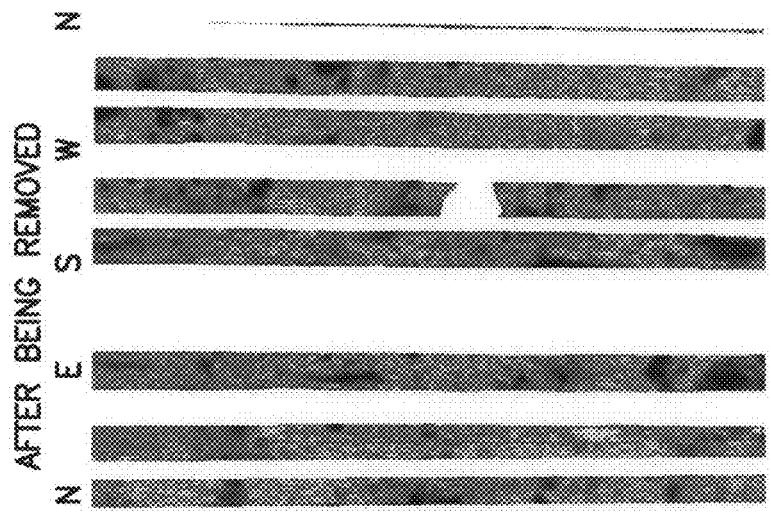
FIG. 15 represents a training image showing the log after the bad data are removed from FIG. 14.
Figure 14:
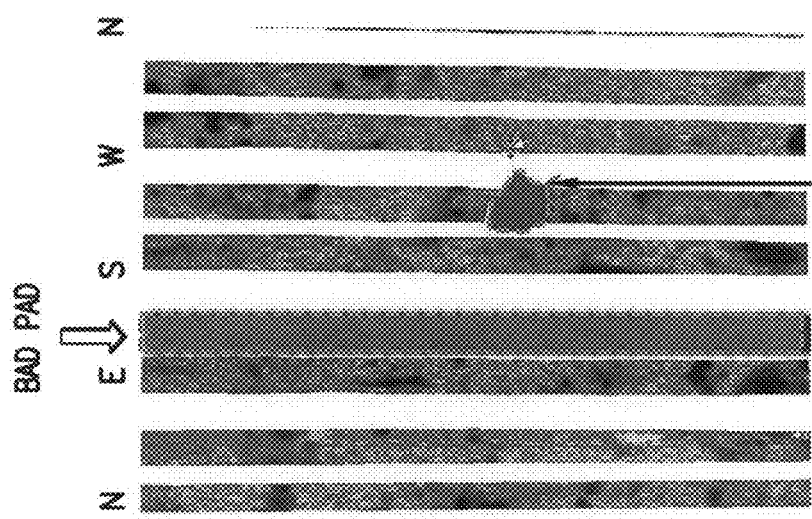
FIG. 14 represents log of vuggy porosity (same as FIG. 9) with a bad pad and missing log data.
Figure 17:
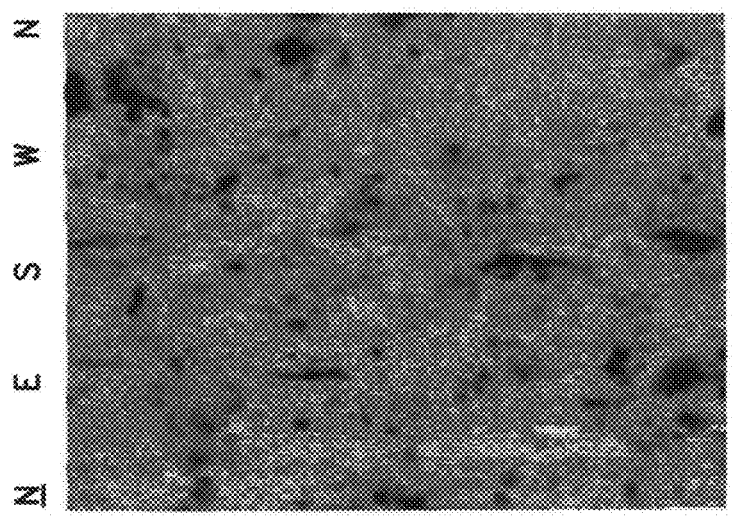
FIGS. 17-19 are three fullbore images using the training image of FIG. 16 once treated with the method according to the invention.
Figure 16:
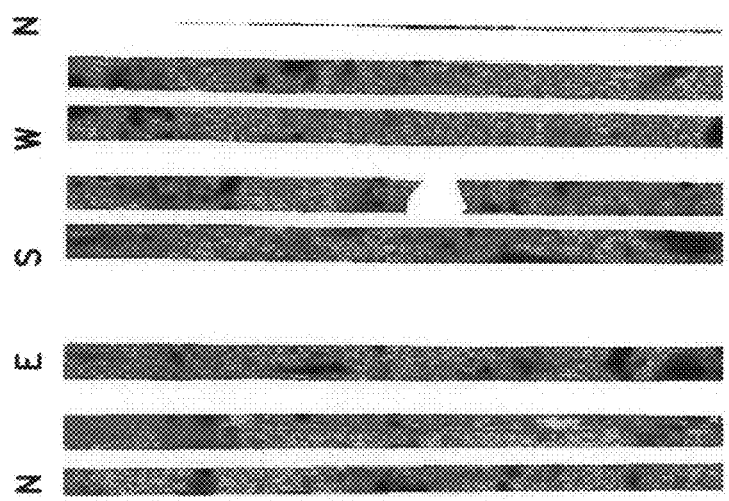
FIG. 16 represents a training image similar to the one of FIG. 15.
Figure 19:
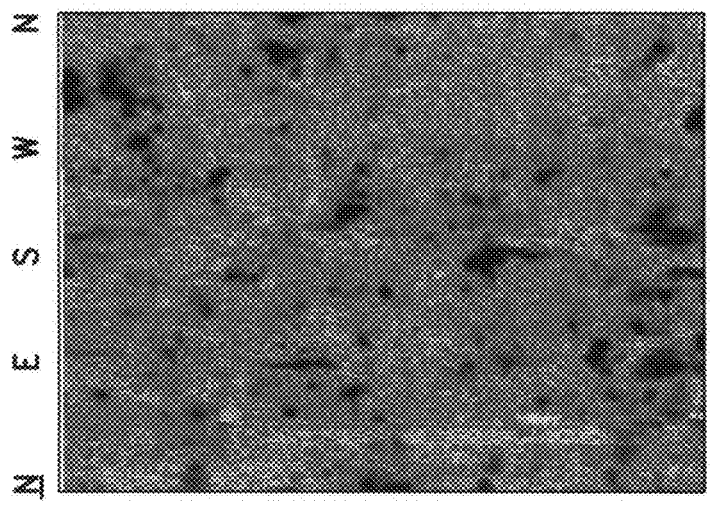
Figure 18:
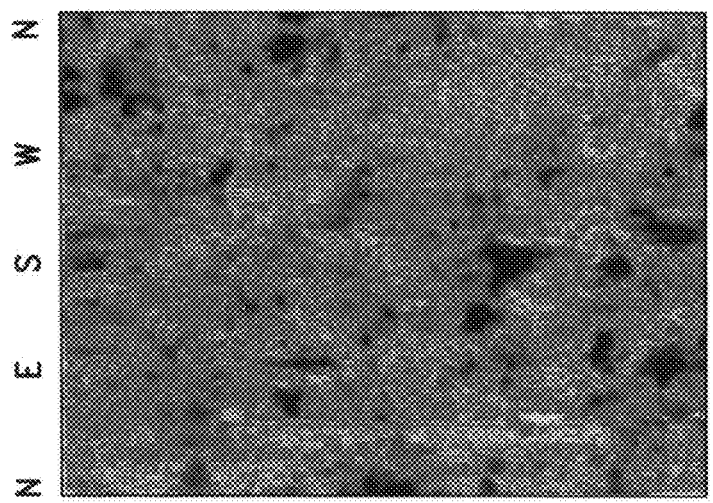

Furthermore, it is quite often that one or more pads or electrodes on the logging tool provide poor-quality images. This can be caused by uneven pad pressure, borehole irregularities and washouts, electronic problems, or contamination by crushed rock materials. FIG. 14 shows an example of a bad pad and a poor-data quality patch in a single-pass log. In one embodiment of the invention, it is possible to eliminate the bad data in order to create a new training image (FIG. 15). This newly created training image, as seen on FIG. 16, will then be used to generate a fullbore images as shown on FIGS. 17 to 19. The FILTERSIM realizations show only subtle variations when compared to the single-pass image of FIG. 14. Note that larger gaps increase uncertainties in the modeled image.

There have been described and illustrated herein a computer-based method for modeling full borehole images from the training images acquired with a logging tool. The most common applications of this method is for the modeling of geological properties for petroleum geology and reservoir simulation, groundwater hydrology, CO2 sequestration, geological outcrop modeling, among others. While particular embodiments of the invention have been described, it is not intended that the invention be limited thereto, as it is intended that the invention be as broad in scope as the art will allow and that the specification be read likewise. Particularly, acquisition of the measured data can be made with any kind of wireline, LWD, MWD tool. It will therefore be appreciated by those skilled in the art that yet other modifications could be made to the provided invention without deviating from its spirit and scope as claimed. Any other feature/pattern-based approach that is different from FILTERSIM algorithm described in this prevision could be used to fill-in the gaps of the image logs.

What is claimed is:

1. A method for characterizing a geological formation traversed by a first borehole, the method comprising:

a) retrieving one or more sets of measured data provided by at least one measuring tool along one or more logged borehole length for one of the first borehole, at least one other borehole or both in order to produce a borehole imaging log, wherein the borehole imaging log has a lateral dimension corresponding to a borehole circumferential direction, wherein the measured data along the lateral dimension is disposed along a plurality of angular sectors covered by electrodes of the at least one measuring tool, and wherein data gaps exist in the borehole imaging log along the lateral dimension between the angular sectors covered by the electrodes of the at least one measuring tool;

b) selecting depth-defined intervals of the borehole imaging log as training images for inputting in a multi-point geostatistical model;
c) determining pattern based simulations for each training image using at least one pixel-based template of the multi-point geostatistical model so as to obtain training image patterns;
d) using the pattern based simulation of each training image to assign to each of the training images a corresponding training image pattern;
e) constructing from the training image patterns one or more fullbore image logs of a borehole wall of the first borehole, wherein constructing the one or more fullbore image logs includes simulating patterns in the data gaps in the borehole imaging log along the lateral dimension; and
f) repeating steps (b) to (e) through the one or more logged borehole length in order to construct fullbore images from successive, adjacent training images.

2. The method according to claim 1, wherein the borehole imaging log includes one of processed raw data that consists of measured values and non-measured values.

3. The method according to claim 1, wherein the borehole imaging log includes one of unidentified borehole image data or data gaps.

4. The method according to claim 3, wherein the one of unidentified borehole image data or data gaps is from the group consisting of one of at least one damaged pad in the reservoir, at least one damaged area in the reservoir, at least one pad with inadequate pad pressure against a borehole wall in the reservoir, at least one pad obstructed from contacting the borehole wall in the reservoir or at least one inoperable pad in the reservoir, electronic malfunctions from the measuring tool or other devices.

5. The method according to claim 3, wherein the determined pattern based simulations for each training image are used to group and then simulate patterns in the data gaps.

6. The method according to claim 1, wherein the one or more set of measured data is from the group consisting of one of logging data having multiple depths of investigation, logging-while-drilling data, wireline logging data or some combination thereof.

7. The method according to claim 1, wherein the constructed fullbore images includes plotting a digital file of the constructed fullbore images onto one of a digital media or hard copy media.

8. The method according to claim 1, wherein pattern based simulations use filter scores.

9. The method according to claim 8, wherein determining the filter scores for each training image includes a filtering process that uses the selected at least one pixel-based template as a filter that processes retrieved one or more set of measured data so as to detect training image patterns, then determines filter scores for each training image pattern.

10. The method according to claim 9, wherein the training image patterns are patterns of pixel associations within the training images that provides filter scores to the neighborhoods around each measured pixel.

11. The method according to claim 1, wherein the training images are oriented as two-dimensional (2D) scalar arrays of continuously variable numerical values.

12. The method according to claim 1, wherein the one or more logged borehole length is one of equal to or less than 1 foot, between 1 to 3 feet, or greater than 3 feet.

13. The method according to claim 1, wherein constructing the fullbore images from successive, adjacent training images includes overlapping each adjacent selected depth-defined intervals of the borehole imaging log.

14. The method according to claim 1, wherein at least one constructed fullbore image allows for a drawing of closed contours around one of at least one dark color patch or at least one light color patch in the borehole images.

15. The method according to claim 14, wherein the at least one dark color patch represents one of electrically non-resistive regions, minimal amplitude of reflected acoustic waves, substantial travel time of reflected acoustic waves, minimal formation density, or some combination thereof.

16. The method according to claim 14, wherein the at least one light color patch represents one of electrically resistive regions, substantial amplitude of reflected acoustic waves, minimal travel time of reflected acoustic waves, substantial formation density or some combination thereof.

17. A method using a multi-point geostatistical model for characterizing a geological formation traversed by a borehole, the method comprising:
a) retrieving a set of measured data provided by at least one tool along depth-defined intervals of the borehole in order to produce a borehole imaging log, wherein the borehole imaging log has a lateral dimension corresponding to a borehole circumferential direction, wherein the measured data along the lateral dimension is disposed along a plurality of angular sectors covered by electrodes of the at least one tool, and wherein data gaps exist in the borehole imaging log along the lateral dimension between the angular sectors covered by the electrodes of the at least one tool;
b) selecting depth-defined intervals of the borehole imaging log as training images for inputting in a multi-point geostatistical model;
c) determining filter scores for each training image using a pixel-based template of the multi-point geostatistical model so as to obtain training image patterns;
d) classifying training image patterns based on their filter scores;
e) constructing from the training image patterns one or more fullbore image logs of a borehole wall from the subterranean area, wherein constructing the one or more fullbore image logs includes simulating patterns in the data gaps in the borehole imaging log along the lateral dimension; and
f) repeating steps (b) to (e) through the depth-defined intervals of the borehole in order to construct fullbore images from successive, adjacent training images.

18. The method according to claim 17, wherein the one or more set of measured data is from the group consisting of one of logging data having multiple depths of investigation, logging-while-drilling data, wireline logging data or some combination thereof.

19. The method according to claim 17, wherein determining the filter scores for each training image includes a filtering process that uses the selected at least one pixel-based template as a filter that processes retrieved one or more set of measured data so as to detect training image patterns, then determines filter scores for each training image pattern.

20. The method according to claim 17, wherein constructing the fullbore images from successive, adjacent training images includes overlapping each adjacent selected depth-defined intervals of the borehole imaging log.

21. A storage device readable by a machine and storing a set of instructions executable by the machine to perform method steps for characterizing a geological formation traversed by a borehole, the method comprising:

a) retrieving a set of measured data provided by at least one oilfield application tool along depth-defined intervals of a reservoir in order to produce a borehole imaging log, wherein the borehole imaging log has a lateral dimension corresponding to a borehole circumferential direction, wherein the measured data along the lateral dimension is disposed along a plurality of angular sectors covered by electrodes of the at least one oilfield application tool, and wherein data gaps exist in the borehole imaging log along the lateral dimension between the angular sectors covered by the electrodes of the at least one oilfield application tool;

b) selecting depth-defined intervals of the borehole imaging log as training images for inputting in a multi-point geostatistical model;

c) determining filter scores for each training image using a pixel-based template of the multi-point geostatistical model so as to obtain training image patterns;

d) classifying training image patterns based on their filter scores;

e) constructing from the training image patterns one or more fullbore image logs of a borehole wall from the reservoir, wherein constructing the one or more fullbore image logs includes simulating patterns in the data gaps in the borehole imaging log along the lateral dimension; and f) repeating steps (b) to (e) through the depth-defined intervals of the reservoir in order to construct fullbore images from successive, adjacent training images.

22. A method for characterizing a geological formation, the method comprising:

a) retrieving one or more set of measured data provided by at least one tool along one or more geological area in order to produce a portion of a complete geological image, wherein the portion of the complete geological image has a lateral dimension corresponding to a borehole circumferential direction, wherein the measured data along the lateral dimension is disposed along a plurality of angular sectors covered by electrodes of the at least one tool, and wherein data gaps exist in the portion of the complete geological image along the lateral dimension between the angular sectors covered by the electrodes of the at least one tool;

b) selecting defined intervals of the portion of the geological image as training images for inputting in a multi-point geostatistical model;

c) determining pattern based simulations for each training image using at least one pixel-based template of the multi-point geostatistical model so as to obtain training image patterns;

d) constructing from the training image patterns one or more complete geological images of the geological area, wherein constructing the one or more complete geological images includes simulating patterns in the data gaps in the portion of the complete geological image along the lateral dimension; and e) repeat steps (b) to (d) through the one or more geological areas in order to construct complete geological images from successive, adjacent training images.

23. The method of claim 1, wherein the borehole imaging log is produced from measured data along the first borehole such that the training images and the measured data are obtained from the same borehole.

* * * * *